US008896883B2

(12) United States Patent
Goto et al.

(10) Patent No.: US 8,896,883 B2
(45) Date of Patent: Nov. 25, 2014

(54) IMAGE PROCESSING APPARATUS, PRINTING APPARATUS, AND IMAGE PROCESSING METHOD

(71) Applicant: Canon Kabushiki Kaisha, Tokyo (JP)

(72) Inventors: Fumitaka Goto, Tokyo (JP); Akitoshi Yamada, Yokohama (JP); Tomokazu Ishikawa, Yokohama (JP); Senichi Saito, Funabashi (JP); Nobutaka Miyake, Yokohama (JP); Mitsuhiro Ono, Tokyo (JP); Ryosuke Iguchi, Kawasaki (JP); Hidetsugu Kagawa, Kawasaki (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/076,622

(22) Filed: Nov. 11, 2013

(65) Prior Publication Data

US 2014/0139853 A1 May 22, 2014

(30) Foreign Application Priority Data

Nov. 16, 2012 (JP) ................................ 2012-252266

(51) Int. Cl.
*H04N 1/405* (2006.01)
*G06K 15/02* (2006.01)
(52) U.S. Cl.
CPC ...................................... *G06K 15/02* (2013.01)
USPC ......................................... 358/3.13; 358/3.06
(58) Field of Classification Search
USPC ................. 358/3.13–3.2; 347/12–15
See application file for complete search history.

(56) References Cited

U.S. PATENT DOCUMENTS

| 6,025,929 | A | | 2/2000 | Nakajima et al. |
| 6,046,819 | A | * | 4/2000 | Yoshida .......................... 358/1.8 |
| 6,135,656 | A | * | 10/2000 | Kato et al. ................ 400/120.15 |
| 6,409,299 | B1 | * | 6/2002 | Aihara ............................. 347/15 |
| 7,370,929 | B2 | | 5/2008 | Kitagawa |
| 2011/0285780 | A1 | | 11/2011 | Yamada et al. |
| 2011/0286020 | A1 | | 11/2011 | Ishikawa et al. |
| 2012/0081439 | A1 | | 4/2012 | Goto et al. |
| 2012/0081449 | A1 | | 4/2012 | Kagawa et al. |
| 2012/0081768 | A1 | * | 4/2012 | Iguchi et al. .................. 358/518 |

FOREIGN PATENT DOCUMENTS

| JP | 10-13674 A | 1/1998 |
| JP | 2007-196472 A | 8/2007 |

* cited by examiner

*Primary Examiner* — Barbara Reinier
(74) *Attorney, Agent, or Firm* — Fitzpatrick, Cella, Harper & Scinto

(57) ABSTRACT

When an input image is shifted by 640 pixels from a test pattern with reference to the position of a nozzle, the remainder is obtained by dividing 640 pixels by pixels of the dither matrix in an x direction. For example, when the size of the dither matrix in the x direction is 256 pixels, the dither matrix is shifted by 128 pixels in a direction reverse to the x direction. In this manner, the phase of the dither matrix at the time of the quantization during test pattern printing matches the phase of the dither matrix at the time of the quantization during input image printing. Consequently, unevenness of the dither matrix at a position N becomes the same in both of the test pattern and the input image. The HS correction to density unevenness caused by the unevenness of the dither matrix becomes suitable for the input image.

8 Claims, 20 Drawing Sheets

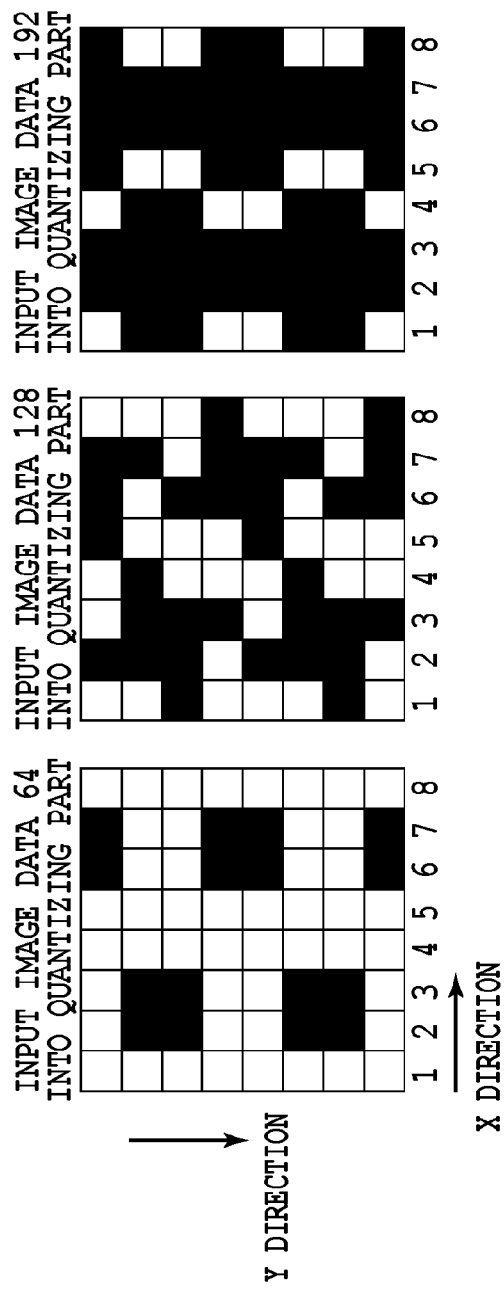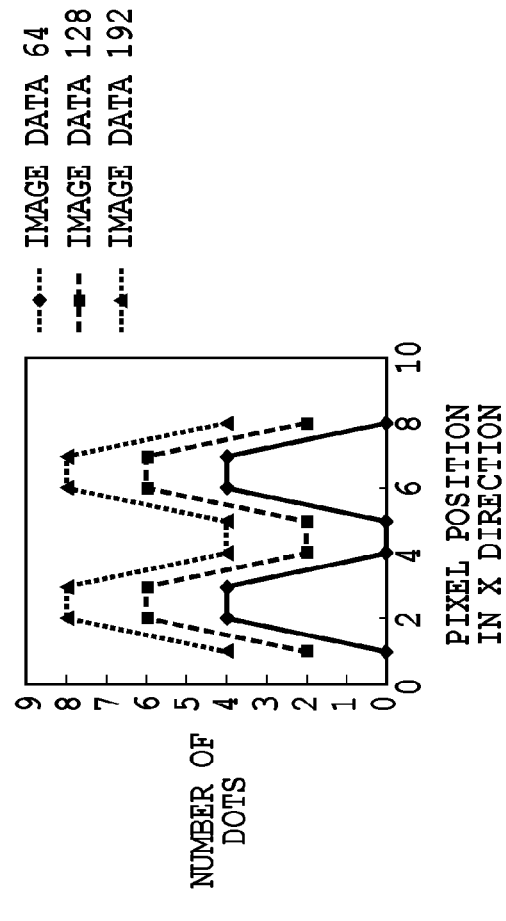
FIG.2A
FIG.2B

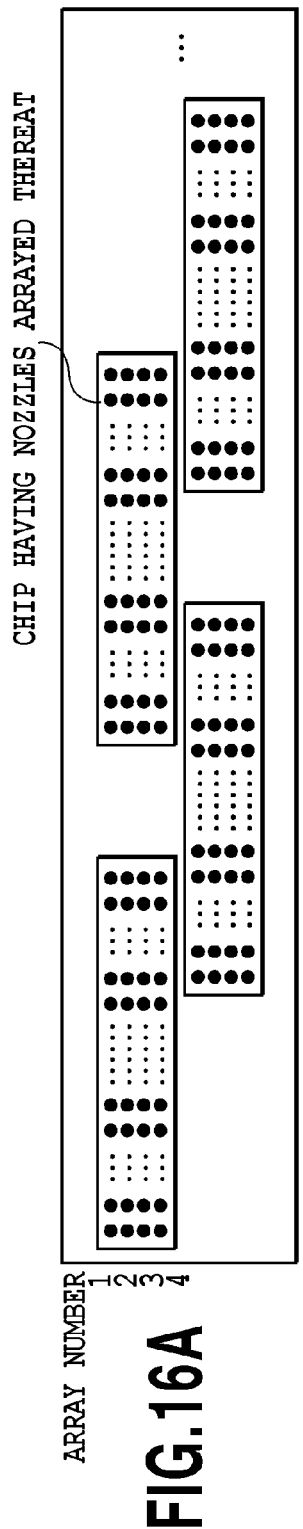
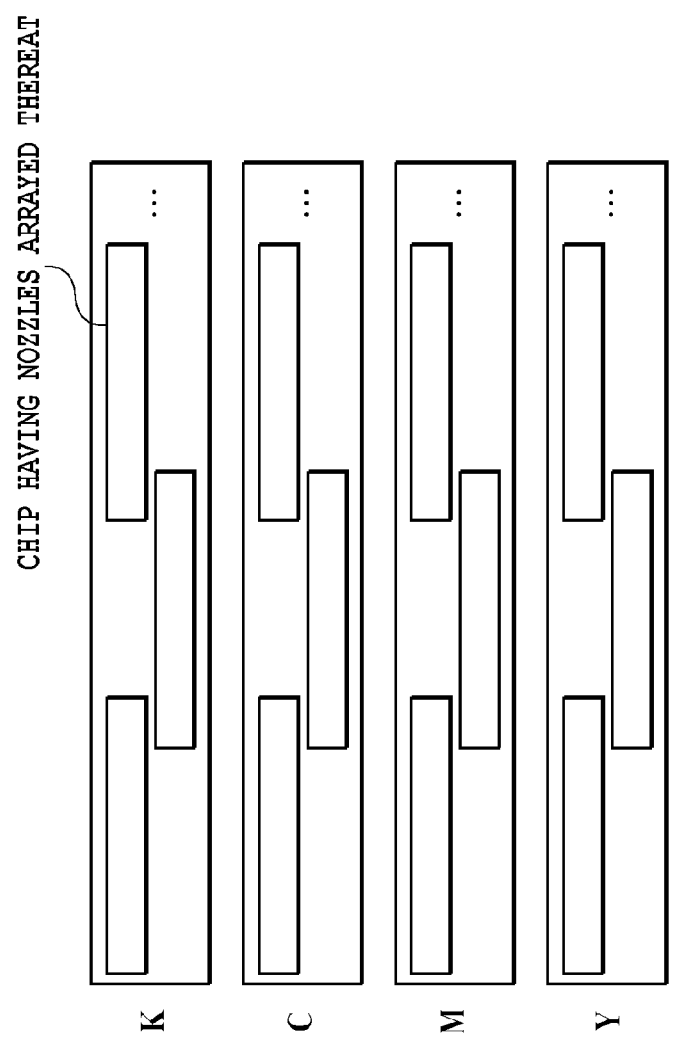
FIG.16A
FIG.16B

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus, and an image processing method and, more particularly, to image processing for quantizing, with a dither matrix, image data that has been corrected, to thus suppress density unevenness caused by variations in print characteristics between printing elements.

2. Description of the Related Art

The head shading (abbreviated as "HS") technique disclosed in Japanese Patent Application Laid-open No. H10-13674 (1998) has been known as one example of the correction for suppressing an uneven density of the aforementioned type. This HS technique is adapted to perform correcting based on information on ink ejection characteristics (i.e., print characteristics) of each of nozzles serving as printing elements. For example, in response to information that amount of ink to be ejected by a certain nozzle is more than normal amount, image data is corrected so as to decrease a density indicated by the image data corresponding to the nozzle. In contrast, in response to information that amount of ink to be ejected by a certain nozzle is less than the normal amount, image data is corrected so as to increase a density indicated by the image data corresponding to the nozzle. In this manner, the number of ink dots to be eventually printed is decreased in the former case or increased in the latter case, so that the density of a print image formed based on the image data can become substantially even in each of the nozzles.

Such an HS technique detects density unevenness from the colorimetric result of a test pattern printed based on data on a predetermined density, and then, determines correction amount for HS processing. In a description below, out of these series of processing, processing up to correction amount determination is referred to as an HS analysis, and further, applying the correction amount resulting from the HS analysis to image data so as to correct the data is referred to as HS correction.

Dithering is one type of quantization for printing a test pattern in the HS analysis. In the case of the quantization by dithering, a value after the quantization is determined only based on a pixel value in input image data and a threshold arrangement on a dither matrix (i.e., a threshold arrangement pattern). As a consequence, dot arrangement on a test pattern to be printed is fixed according to the dither matrix.

In this case, the number of dots to be printed in the case of the quantization by dithering is varied according to positions of nozzles in a nozzle array direction corresponding to pixels to be quantized. For example, it is conceived that a test pattern image having a uniform pixel value is quantized with a dither matrix of dot concentration (fattening) type in a size of 8 pixels×8 pixels (64 gradations), as illustrated in FIG. 1. Here, the nozzle array direction is assumed to be an x direction.

FIGS. 2A and 2B illustrate quantization results with fattening type dither matrixes and the number of print dots in the nozzle array direction (i.e., the x direction), respectively, with respect to pieces of input image data having pixel values of 64, 128, and 192. In FIG. 2A, solid squares represent pixels to be printed with dots. Moreover, FIG. 2B illustrates the number of dots to be printed at pixel positions in the x direction. As illustrated in FIG. 2B, in the case where the pixel value of input image data is 192, the number of dots is 4 at pixel positions "1," "4," "5," and "8" in the x direction whereas the number of dots is 8 at pixel positions "2," "3," "6," and "7" in the x direction: namely, the number of dots to be printed is varied according to the pixel positions. In this manner, in the case where a uniform image consisting of pixels having the same pixel value is printed, the number of dots to be printed in the array direction of print elements (i.e., the x direction here) is unfavorably varied according to the pixel positions in the case of the quantization with the dither matrix. That is to say, the number of dots to be printed is varied at positions of pixels relative to a threshold arrangement pattern on the dither matrix. Alternatively, in an error diffusion method as another quantization technique, there is a dot delay region until errors are accumulated. However, when the number of dots to be printed at the pixel positions in the array direction of the print elements is counted while the dot delay region is bypassed, the number of dots is less varied than in the dither method. In other words, with the quantization by the dither method in printing the test pattern, the density of the test pattern to be printed becomes relatively largely uneven according to the pixel positions in the array direction of the print elements.

As described above, it is found that in the HS analysis, density unevenness including variations caused by the quantization in printing the test pattern is detected in addition to the variations in print characteristic such as ejection amount, and then, correction amount is determined.

Moreover, in the HS correction, the positions of the nozzles correspond to the correction positions, to which the correction amount determined by the HS analysis is applied. Specifically, image data on the pixels at positions corresponding to the positions of the nozzles in a print head is corrected in the HS correction, as illustrated in FIG. 3. Hereinafter, correspondence with reference to the positions of the nozzles will be referred to as "absolute position correspondence." On the other hand, in printing an input image, the dither matrix to be used in the quantization is used in a manner corresponding to the pixel position of the input image, as illustrated in FIG. 4. Hereinafter, correspondence with reference to the positions of the pixels of the image will be referred to as "relative position correspondence."

A printing apparatus generally copes with a plurality of widths of print mediums. In view of this, a test pattern is provided in such a manner as to print a maximum printable width, determine the correction amount with respect to all of nozzles, and thus, cope with any widths of print mediums. In the meantime, in printing an input image, a print medium having a width smaller than the maximum printable width may be used. Consequently, positions, to which dither matrixes are applied, with respect to positions of nozzles may be different between printing a test pattern and printing an input image, as illustrated in FIG. 4. As a consequence, the positions of pixels (i.e., nozzles) corresponding to correction amount that is determined by the HS analysis and includes quantization variations may be applied to image data at different pixel (i.e., nozzle) positions, that is, positions of pixels (i.e., nozzles) having different quantization variations during printing an input image. Consequently, the HS correction cannot be properly made, thereby causing the above-described density unevenness on a printout of the input image due to the quantization with the dither matrix. As described above, since the dither method causes larger density unevenness by the quantization than by, for example, the error diffusion method, the problem of the density unevenness becomes more serious in the case of the dither method used for the quantization.

Incidentally, as disclosed in Japanese Patent Application Laid-Open No. 2007-196472, there has been known a technique for modifying a dither matrix corresponding to each of nozzles according to density unevenness of each of the nozzles. This technique can correct density unevenness. With this technique, quantization also is performed in accordance with the absolute position correspondence. However, this technique relates to a print head having one nozzle array for each of colors at a print position in an x direction. Japanese Patent Application Laid Open No. 2007-196472 is silent about a print head having a multiple-array configuration consisting of a plurality of nozzles for colors. As described later, when nozzles are determined based on a quantization result by the dither method and a distribution pattern for multiple arrays (i.e., an array distribution pattern), an ejection rate between arrays is varied according to positions in an x direction. Ejection amount may be varied in nozzles at the same position in the x direction out of multiple-array nozzles due to causes from the viewpoint of fabrication or the like. Therefore, variations in ejection rate between the arrays of the multiple-array nozzles and variations in ejection amount are reflected on density unevenness in the x direction. Thus, the technique relevant to the one-array configuration disclosed in Japanese Patent Application Laid Open No. 2007-196472 cannot correct the density unevenness of a line head having the multiple-array configuration.

SUMMARY OF THE INVENTION

An object of the present invention is to provide an image processing apparatus, a printing apparatus, and an image processing method, capable of reducing density unevenness caused by a misalignment between HS correction on the basis of absolute position correspondence and a quantization applying position with a dither matrix on the basis of relative position correspondence.

In a first aspect of the present invention, there is provided an image processing apparatus that generates print data used for performing printing using one or more printing element arrays in each of which printing elements are arrayed, the apparatus comprising: a determining unit configured to determine a correction parameter for each of unit areas in an array direction of the printing elements, based on a measurement result of a test pattern printed based on data that has been subjected to quantization using a dither matrix; a correction unit configured to apply the correction parameter to image data by switching the application of the correction parameter per unit area so as to correct the image data; and a quantization unit configured to quantize the image data corrected by the correction unit by using the dither matrix, for generating print data, wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

In a second aspect of the present invention, there is provided a printing apparatus that performs printing based on print data by using one or more printing element arrays in each of which printing elements are arrayed, the apparatus comprising: a determining unit configured to determine a correction parameter for each of unit areas in an array direction of the printing elements, based on a measurement result of a test pattern printed based on data that has been subjected to quantization using a dither matrix; a correction unit configured to apply the correction parameter to image data by switching the application of the correction parameter per unit area so as to correct the image data; and a quantization unit configured to quantize the image data corrected by the correction unit by using the dither matrix, for generating print data, wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

In a third aspect of the present invention, there is provided an image processing method for generating print data used for performing printing using one or more printing element arrays in each of which printing elements are arrayed, the method comprising: a determining step of determining a correction parameter for each of unit areas in an array direction of the printing elements, based on a measurement result of a test pattern printed based on data that has been subjected to quantization using a dither matrix; a correction step of applying the correction parameter to image data by switching the application of the correction parameter per unit area so as to correct the image data; and a quantization step of quantize the image data corrected in the correction step by using the dither matrix, for generating print data, wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

With the above-described configuration, it is possible to reduce the density unevenness caused by the misalignment between the HS correction on the basis of the absolute position correspondence and the quantization applying position with the dither matrix on the basis of the relative position correspondence.

Further features of the present invention will become apparent from the following description of exemplary embodiments with reference to the attached drawings.

BRIEF DESCRIPTION OF THE DRAWINGS

FIGS. 2A and 2B are diagrams illustrating quantization results with dither masks of a dot fattening type and the number of print dots in a nozzle array direction, respectively;

FIGS. 16A and 16B are diagrams illustrating the configuration of a line head having four nozzle arrays according to a second embodiment of the present invention;

DESCRIPTION OF THE EMBODIMENT

Hereinafter, embodiments of the present invention will be explained in detail with reference to the attached drawings.

Figure 1:
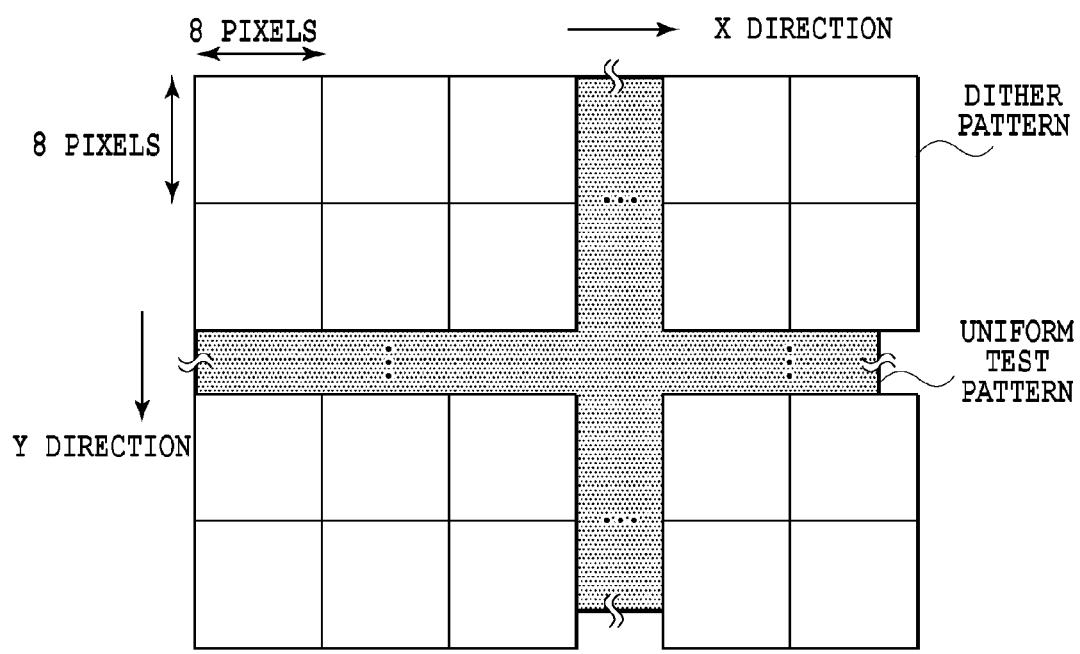
FIG. 1 is a diagram explanatory of a size of a dither matrix.
Figure 3:
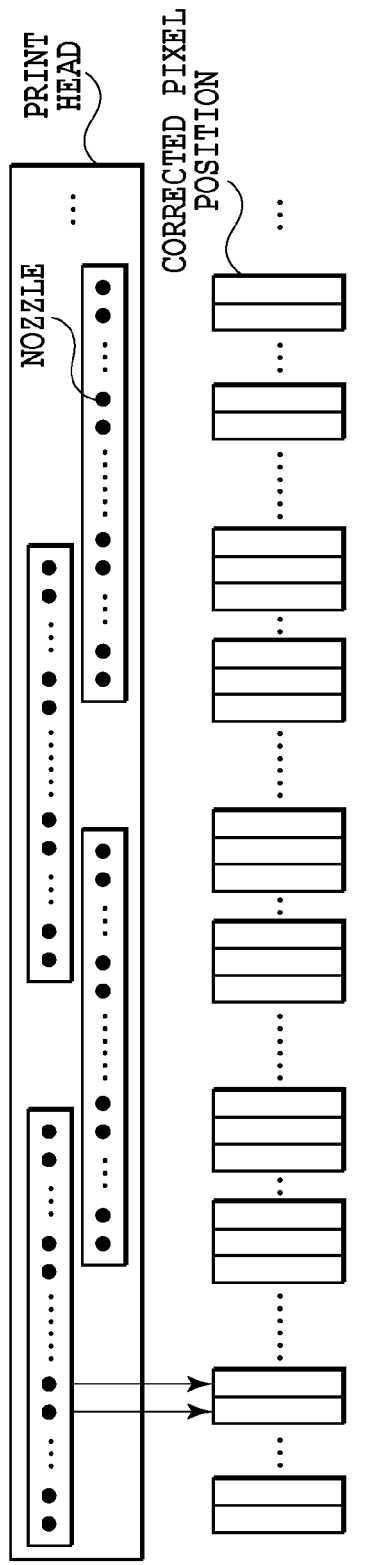
FIG. 3 is a diagram explanatory of absolute position correspondence.
Figure 4:
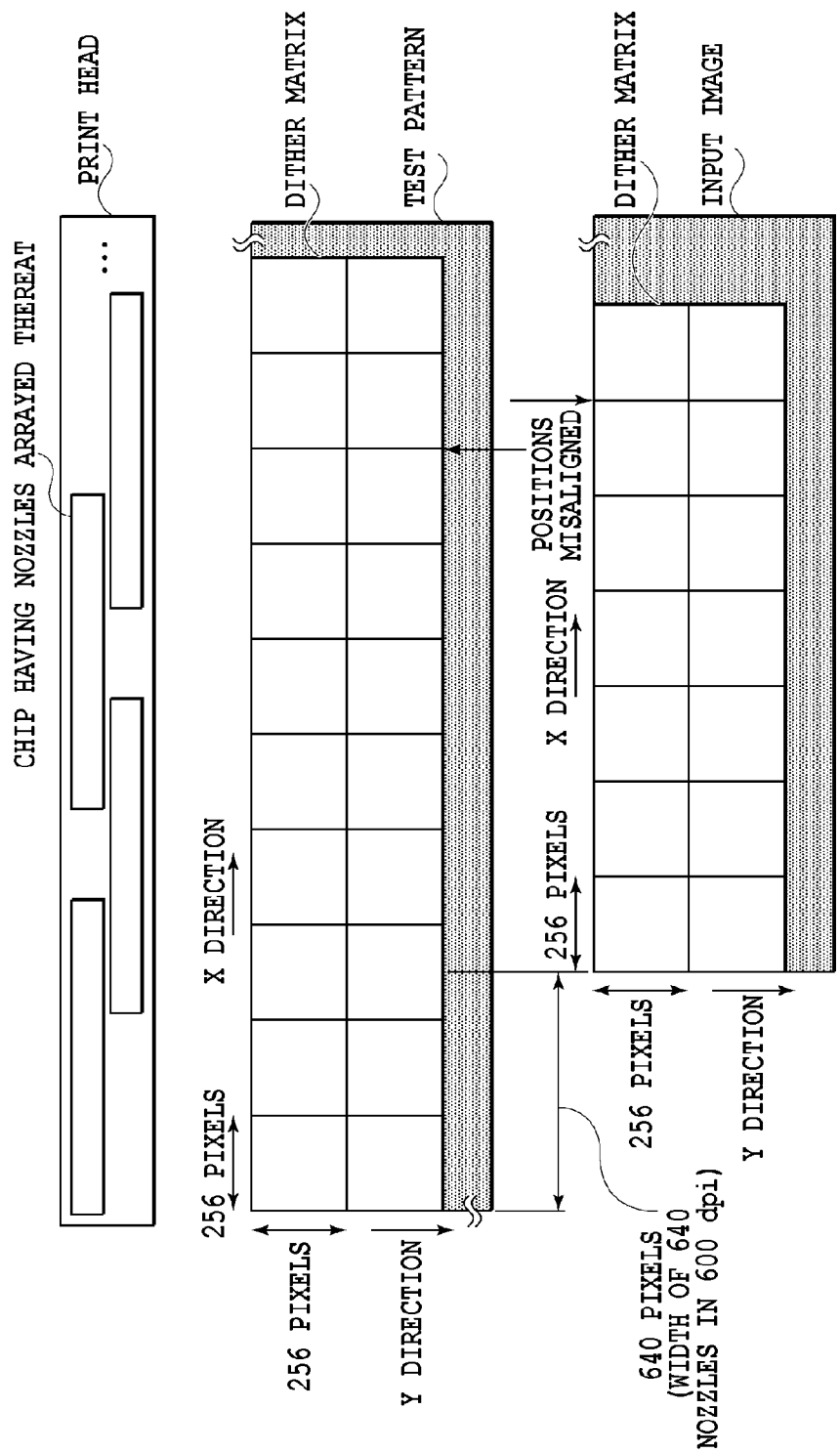
FIG. 4 is a diagram explanatory of relative position correspondence.
Figure 5:
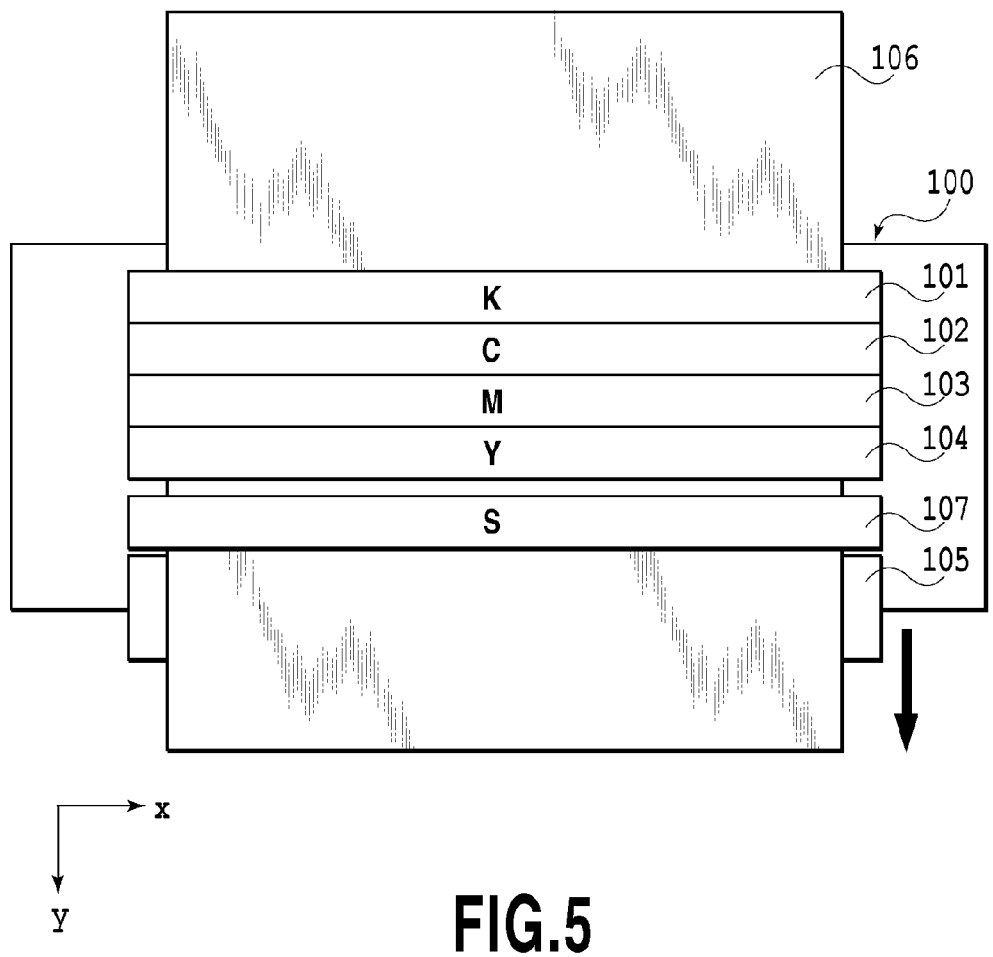
FIG. 5 is a diagram schematically illustrating a printer as an ink jet printing apparatus according to one embodiment of the present invention.

FIG. 5 is a view schematically showing an ink jet printer exemplifying an ink jet printing apparatus of the present invention. The printer in the present embodiment is a printing apparatus of a full line type, and it is provided with print heads 101 to 104, as shown in FIG. 1. Each of the print heads 101 to 104 includes nozzle arrays (i.e., printing element arrays), which correspond to the width of a print medium 106 and has a plurality of nozzles serving as printing elements for ejecting the same kind of ink, the nozzles being arrayed in an x direction (i.e., an array direction of print elements), as described later with reference to FIG. 8. The print heads 101 to 104 eject black (K), cyan (C), magenta (M), and yellow (Y) inks, respectively. The print heads 101 to 104 for ejecting the plurality of kinds of inks are arranged in a y direction that is a conveyance direction of the print medium.

The print medium 106 is conveyed in the y direction crossing the x direction in FIG. 1 when a conveyance roller 105 (and other rollers, not shown) is rotated by the driving force of a motor, not shown. During the conveyance of the print medium 106, ink is ejected from the plurality of nozzles in each of the print heads 101 to 104 based on print data at a frequency corresponding to the conveyance speed of the print medium 106. Consequently, dots of each color are formed at a predetermined resolution based on the print data, and then, an image is printed on the print medium 106.

Figure 9A:
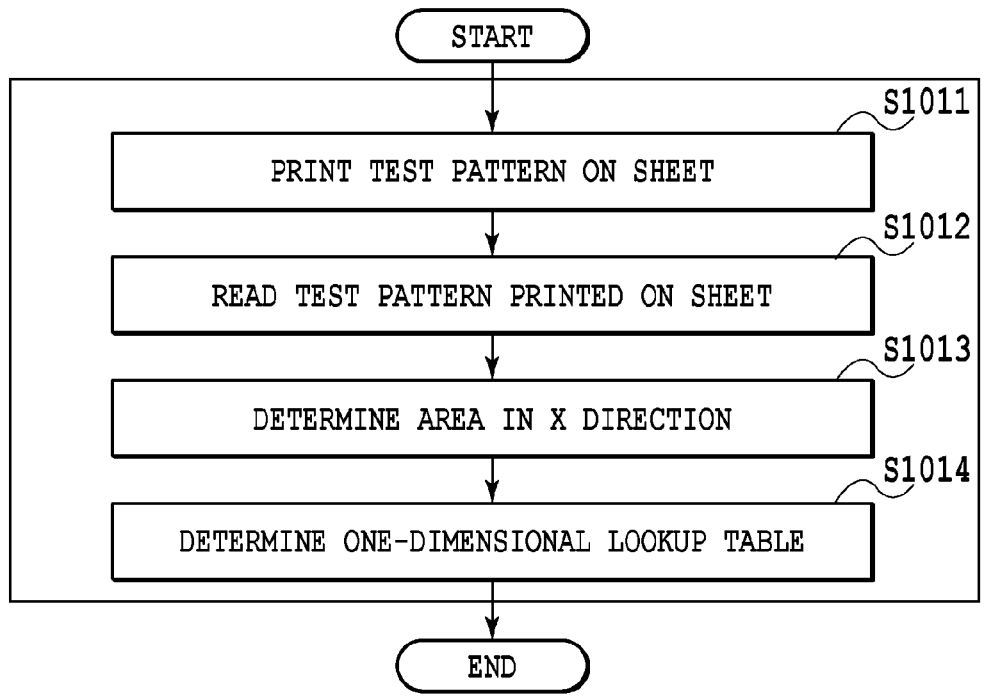
FIGS. 9A and 9B are flowcharts explanatory of creating parameters of a table to be used in an HS processing part 406 illustrated in FIG. 7 and image processing with parameters that are created during an actual printing operation, respectively.

A scanner 107 is provided downstream, in the conveyance direction, of the print heads 101 to 104 arranged in the y direction. The scanner 107 has reading elements arranged at a predetermined pitch in the x direction, and thus, is used for reading an image, for example, reading the density of a patch printed on the print medium when a correction parameter for HS (abbreviating "head shading"), described later with reference to FIG. 9A, is generated. And then, the scanner 107 outputs RGB data as a reading result.

Incidentally, a printing apparatus, to which the present invention is applicable, is not limited to the above-described full-line type apparatus. For example, the present invention is applicable also to a so-called serial type printing apparatus in which print heads are configured in such a manner as to scan a print medium in a direction crossing a conveyance direction of a print medium so as to print the image. Moreover, although the print heads are provided in a manner corresponding to the ink colors in the present embodiment, a single print head may eject a plurality of color inks. Furthermore, nozzle arrays corresponding to a plurality of color inks may be arrayed on a single ejection board.

Figure 6:
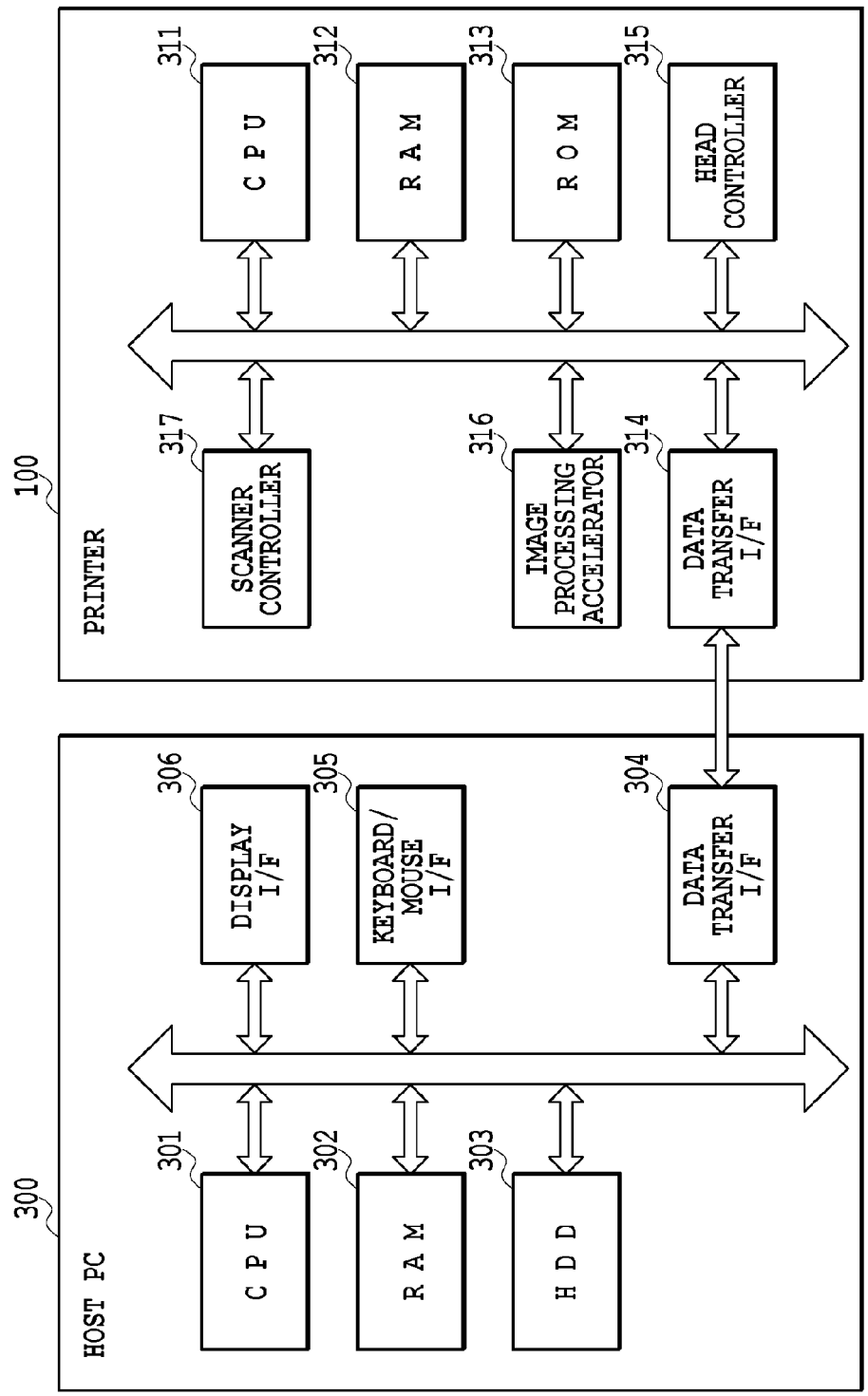
FIG. 6 is a block diagram illustrating a printing system including the printer illustrated in FIG. 5 and a personal computer (abbreviated as a "PC") 300 as a host apparatus.

FIG. 6 is a block diagram illustrating a printing system including the printer shown in FIG. 5 and a personal computer (abbreviated as a "PC") 300 serving as a host apparatus.

The host PC 300 principally includes the following constituent elements. A CPU 301 performs processing in accordance with a program stored in an HDD 303 or a RAM 302 serving as a storing part. The RAM 302 is a volatile storing part, for temporarily storing a program or data therein. In the meantime, the HDD 303 is a non-volatile storing part, for storing a program or data therein in the same manner. A data transfer I/F (abbreviating an "interface") 304 is adapted to control the transmission or reception of data to or from a printer 100. This data transmission or reception connecting system is achieved by using a USB, IEEE1394, a LAN, or the like. A keyboard/mouse I/F 305 is designed to control an HID (abbreviating a "human interface device") such as a keyboard or a mouse. A user can input data via the I/F 305. A display I/F 306 controls displaying by a display, not shown.

In the meantime, the printer 100 principally includes the following constituent elements. A CPU 311 performs processing in an embodiment regarding the HS, described later, in accordance with a program stored in a ROM 313 or a RAM 312. The RAM 312 is a volatile storing part, for temporarily storing a program or data therein. The ROM 313 is a non-volatile storing part capable of storing therein table data or a program to be used in the HS, described later.

A data transfer I/F 314 controls the transmission or reception of data to or from the PC 300. A head controller 315 supplies print data to each of the print heads 101 to 104 shown in FIG. 1, and controls an ejecting operation by the print heads. Specifically, the head controller 315 reads a control parameter and print data stored at a predetermined address of the RAM 312. When the CPU 311 writes the control parameter and the print data at the predetermined address of the RAM 312, the head controller 315 starts processing so as to eject ink from the print head. A scanner controller 317 controls each of the reading elements in the scanner 107 shown in FIG. 1, and then, outputs the RGB data obtained by the reading elements to the CPU 311.

An image processing accelerator 316 is hardware capable of performing image processing at a speed higher than that of the CPU 311. Specifically, the image processing accelerator 316 reads a parameter and data required for the image processing from a predetermined address of the RAM 312. When the CPU 311 writes the parameter and data at the predetermined address of the RAM 312, the image processing accelerator 316 is started up to cause the data to be subjected to predetermined image processing. In the present embodiment, software executed by the CPU 311 performs processing of creating parameters of a correction table to be used in an HS processing part, described later. In the meantime, the hardware of the image processing accelerator 316 performs image processing at the time of printing including the processing by the HS processing part. Here, the image processing accelerator 316 is not an essential constituent element. Therefore, it is to be understood that only the CPU 311 may perform the table parameter creation and the image processing according to the specifications of a printer.

Figure 7:
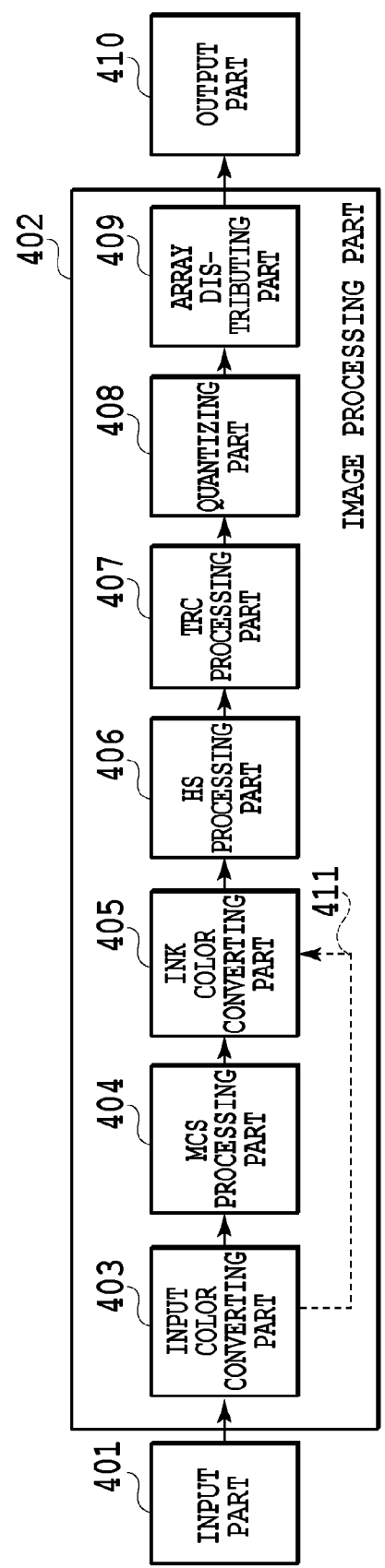
FIG. 7 is a block diagram illustrating the structure of image processing to be performed by an ink jet printer according to a first embodiment of the present invention.

FIG. 7 is a block diagram illustrating the structure of image processing to be performed by an ink jet printer according to a first embodiment of the present invention. That is to say, an image processing part of the present embodiment is made up of the elements required for controlling and processing in the printer 100 illustrated in FIG. 6. Here, it should be construed that the present invention is applicable to not only this configuration but also other configurations. For example, the image processing part may be made up of the elements in the PC 300 illustrated in FIG. 6. Alternatively, a part of the image processing may be made up of elements of the PC 300 whereas the other parts of the image processing part may be made up of the elements of the printer 100. Such image processing parts will be referred to as an image processing apparatus in the present specification.

As shown in FIG. 7, an input part 401 outputs image data received from the host PC 300 to an image processing part 402. The image processing part 402 is constituted by including an input color converting part 403, an MCS (abbreviating Multi Color Shading) processing part 404, an ink color converting part 405, an HS processing part 406, a TRC (abbreviating "tone reproduction curve") processing part 407, a dither processing part 408, and an array distributing part 409.

In the image processing part 402, first, the input color converting part 403 converts the input image data received from the input part 401 into image data according to a color reproduction area by the printer. In the present embodiment, the input image data represents color coordinates (R, G, B) in color space coordinates based on the sRGB that indicates colors represented on a monitor. The input color converting part 403 converts the R, G, and B input image data, each having 8 bits, into image data (R', G', B') corresponding to the color reproduction area by the printer by a known technique such as matrix operation or processing using a three-dimensional look-up table (abbreviated as a "3DLUT"). In the present embodiment, interpolation is performed simultaneously with the processing using the 3DLUT, thus achieving the conversion. Here, the resolution of the 8-bit image data to be processed in the image processing part 402 in the present embodiment is 600 dpi, and further, the resolution of binary data obtained by quantization in the dither processing part 408 also is 600 dpi.

The MCS (abbreviating Multi Color Shading) processing part 404 subjects image data converted by an input color converting part 403 to conversion so as to correct a difference in shade. The MCS processing part 504 corrects the image data for each processing unit, described later, by using a conversion table (i.e., a correction table) consisting of a three-dimensional look-up table. This correction can reduce a difference in color that could not be corrected by the conventional HS. More specifically, it is possible to reduce a difference in color caused by variations in the ejection characteristics of nozzles in a print head in an output part 410.

The ink color converting part 405 converts the R, G, and B image data, each having 8 bits, processed by the input color converting part 403 into image data that is color signal data on ink to be used in the printer. Since the printer 100 in the present embodiment uses black (K), cyan (C), magenta (M), and yellow (Y) inks, the image data on an RGB signal is converted into image data consisting of 8-bit color signals representing K, C, M, and Y inks. This color conversion also is achieved by simultaneously using an interpolating operation with the 3DLUT in the same manner as the above-described processing by the input color converting part 503. Here, the technique of a matrix operation or the like may be used as another converting technique in the same manner as described above.

The HS (Head Shading) processing part 406 receives the image data on the ink color signal and subjects the 8-bit data per ink color to correction according to the ejection characteristics of each of the nozzles constituting the print head.

The TRC (Tone Reproduction Curve) processing part 407 subjects the image data consisting of the 8-bit ink color signals that have been subjected to the HS processing to correction for adjusting the number of dots to be printed by an output part 409 per ink color. In general, no linear relationship is built between the number of dots to be printed on a print medium and an optical density achieved by the print medium with the number of dots. Consequently, the TRC processing part 407 adjusts the number of dots to be printed on a print medium by correcting the 8-bit image data, so as to build the linear relationship.

The dither processing part 408 quantizes the 256-value and 8-bit image data on the ink color, the image data having been processed in the TRC processing part 407, thereby generating binary data of 1 bit, in which "1" indicates printing whereas "0" indicates non-printing. Incidentally, the present invention is not limited to a configuration in which the 8-bit image data is converted directly into binary data (i.e., dot data). For example, the 8-bit image data may be once quantized to multi-valued data consisting of several bits, and in the end, may be converted into binary data with a dot arrangement pattern corresponding to the quantized multi-valued data.

The array distributing part 409 is adapted to determine to which array in a print head having a multiple-array configuration quantized binary data is distributed, followed by printing. In the case of the use of a print head having a one-array configuration, this processing may be skipped. Binary data distributed to arrays is sent to the output part 410.

The output part 410 drives the print head to eject each color ink onto the print medium for performing printing based on the binary data (i.e., the dot data) obtained via the array distributing part 409 or directly from the dither processing part 408. In the present embodiment, the output part 410 includes a print mechanism provided with the print heads 101 to 104 shown in FIG. 5.

First Embodiment

Figure 8A:
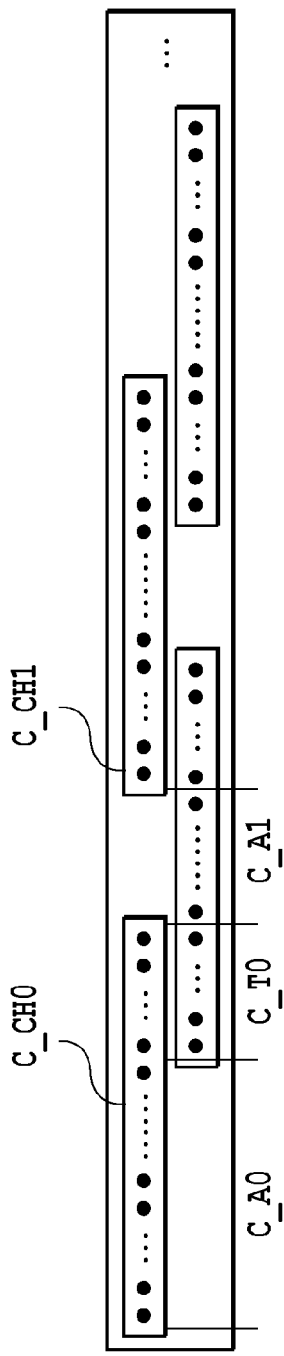
FIG. 8A is a diagram illustrating the structure of a line type print head to be used in the first embodiment.
Figure 8B:
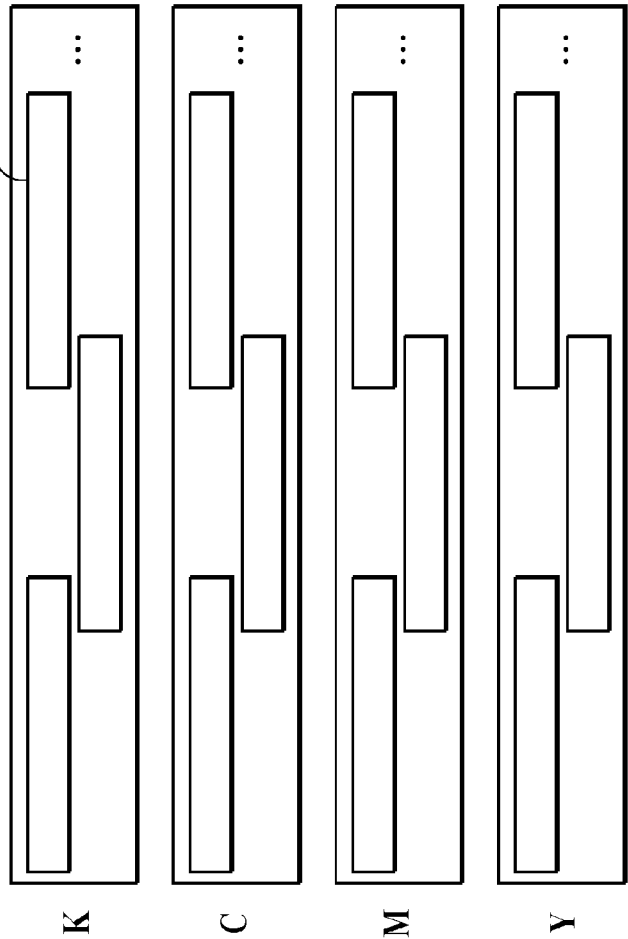
FIG. 8B is a diagram illustrating line heads, explained with reference to FIG. 8A, provided for ink colors, respectively.

First, a description will be given of a print head to be used in a first embodiment of the present invention. FIG. 8A is a diagram illustrating the structure of a line type print head (hereinafter simply referred to also as a "line head") to be used in the first embodiment. The line head according to the present embodiment includes a plurality of head chips arranged thereat. The nozzles of adjacent chips C_CH0 and C_CH1, for example, are arranged in such a manner as to overlap with counterpart nozzles in a region C_T0. The plurality of nozzles in each of the chips are arrayed at a pitch equivalent to 600 dpi in the x direction (see FIG. 5). FIG. 8B is a diagram illustrating the line heads explained with reference to FIG. 8A provided for ink colors. As illustrated in FIGS. 8A and 8B, the line head according to the present embodiment has the configuration of one line for each of the ink colors.

Figure 9B:
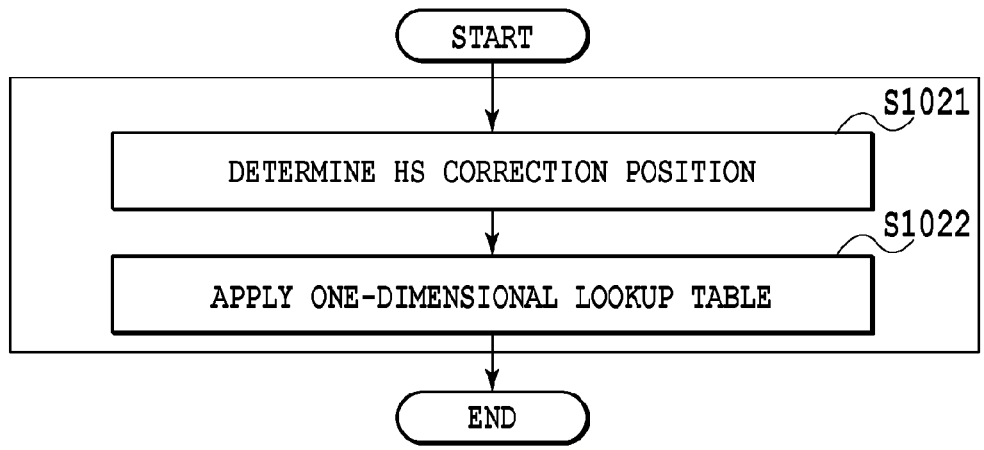

FIGS. 9A and 9B are flowcharts explanatory of creating parameters of a table to be used in the HS processing part 406 illustrated in FIG. 7 and image processing during an actual printing operation with parameters that are created, respectively. That is to say, FIGS. 9A and 9B illustrate the processing procedures of the above-described HS analysis and HS correction, respectively. In FIGS. 9A and 9B, an HS analysis process is performed in steps S1011 to S1014 whereas an HS correction process is performed in steps S1021 and S1022.

FIG. 9A illustrates steps executed by the CPU 311 in order to create parameters of a conversion table as a one-dimensional lookup table to be used in the HS processing part 406 in the present embodiment. In the present embodiment, this parameter generation is forcibly or selectively performed when a printer is fabricated, a printer is used for a predetermined period of time, or a printer performs a printing operation by predetermined amount. Alternatively, the parameter generation may be performed before every printing operation, for example. In other words, this processing can be performed as so-called calibration, thereby updating table parameters contained in a conversion table. Regarding, for example, a nozzle group (i.e., a processing unit) whose ejection amount is measured to be more than normal amount and whose patch density is measured to be higher, the pixel value of image data consisting of ink color signals corresponding to the nozzle group is corrected to become smaller based on the table parameters in the HS processing part, thereby reducing the number of dots to be printed by the nozzle group. In contrast, regarding a nozzle group whose patch density is measured to be lower, the pixel value of image data consisting of ink color signals corresponding to the nozzle group is corrected to become greater.

Figure 10A:
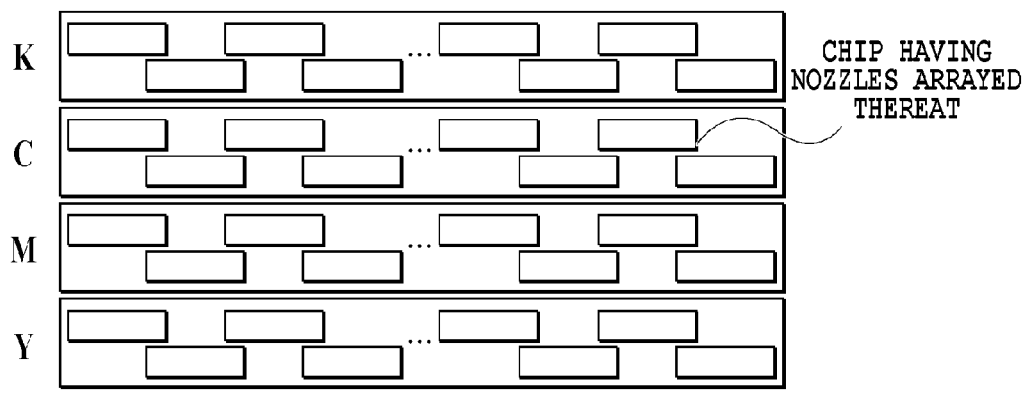
FIGS. 10A and 10B are diagrams explanatory of HS test pattern printing according to the first embodiment.
Figure 10B:
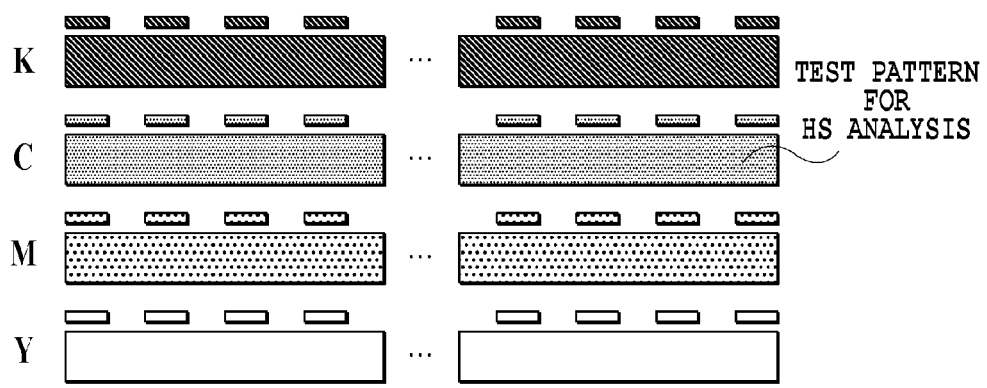

Referring to FIG. 9A, first in step S1011, a test pattern illustrated in FIG. 10B is printed on a print medium by a line head having the structure illustrated in FIG. 10A. As illustrated in FIGS. 10A and 10B, a pattern of each of the colors is printed in a primary color by all of nozzles that are within a range usable for each of the colors and located at the same position with respect to each of the colors. Print data on a test pattern is generated by the image processing part 402, described above, with reference to FIG. 7. At this time, a parameter in each of the MCS processing part 404 and the HS processing part 406 in the image processing part 402 is uniform, and therefore, the parameter cannot be varied according to the position of the nozzle.

Moreover, a dither matrix to be used in the quantizing part 408 (see FIG. 7) is applied to a test pattern of each ink color data whose resolution is 600 dpi and whose density is even, as illustrated in FIG. 1. Specifically, a dither matrix is applied to a test pattern such that the left end of the dither matrix in the x direction is aligned with the left end of a test pattern in the x direction, that is, the left end of a nozzle range used for printing the test pattern. The dither matrix consists of 256 pixels×256 pixels, and further, is repeatedly used in the x and y directions. As illustrated in FIG. 1, the same dither matrixes are applied in such a manner as to be arranged in a tiled fashion.

Next, in step S1012, the test pattern printed as described above is read in a resolution of 600 dpi by the scanner 107 (see FIG. 5). Thereafter, in step S1013, a unit area in the x direction as a processing unit for the HS correction is determined based on the read measurement result. Here, the unit area in the x direction is assumed as one pixel having a resolution of 600 dpi.

In the end, in step S1014, a one-dimensional lookup table is determined according to the RGB value read per determined unit area. That is to say, a correction parameter for the HS processing is obtained. A value obtained by averaging values of 256 pixels in the y direction with respect to one pixel in the x direction, for example, is used as the read RGB value. There have been previously prepared tables for determining the relationship of the one-dimensional lookup table to a difference between a target RGB value and the read RGB value. With these tables, a one-dimensional lookup table suitable for the read RGB value is determined. With another technique, test patterns may be printed in a plurality of gradations per ink, and then, a one-dimensional lookup table for correcting the read RGB value to the target RGB value in each of the gradations may be generated, and then, determined.

Here, the density according to the ejection amount and the density according to the number of dots determined by the dither matrix are reflected on the RGB value read per unit area. Consequently, the one-dimensional lookup table for correcting two types of unevenness below is determined per area: namely, unevenness of the ejection amount of the nozzle corresponding to printing in the unit area and unevenness of the dither matrix for determining the number of dots in the unit area.

Figure 11:
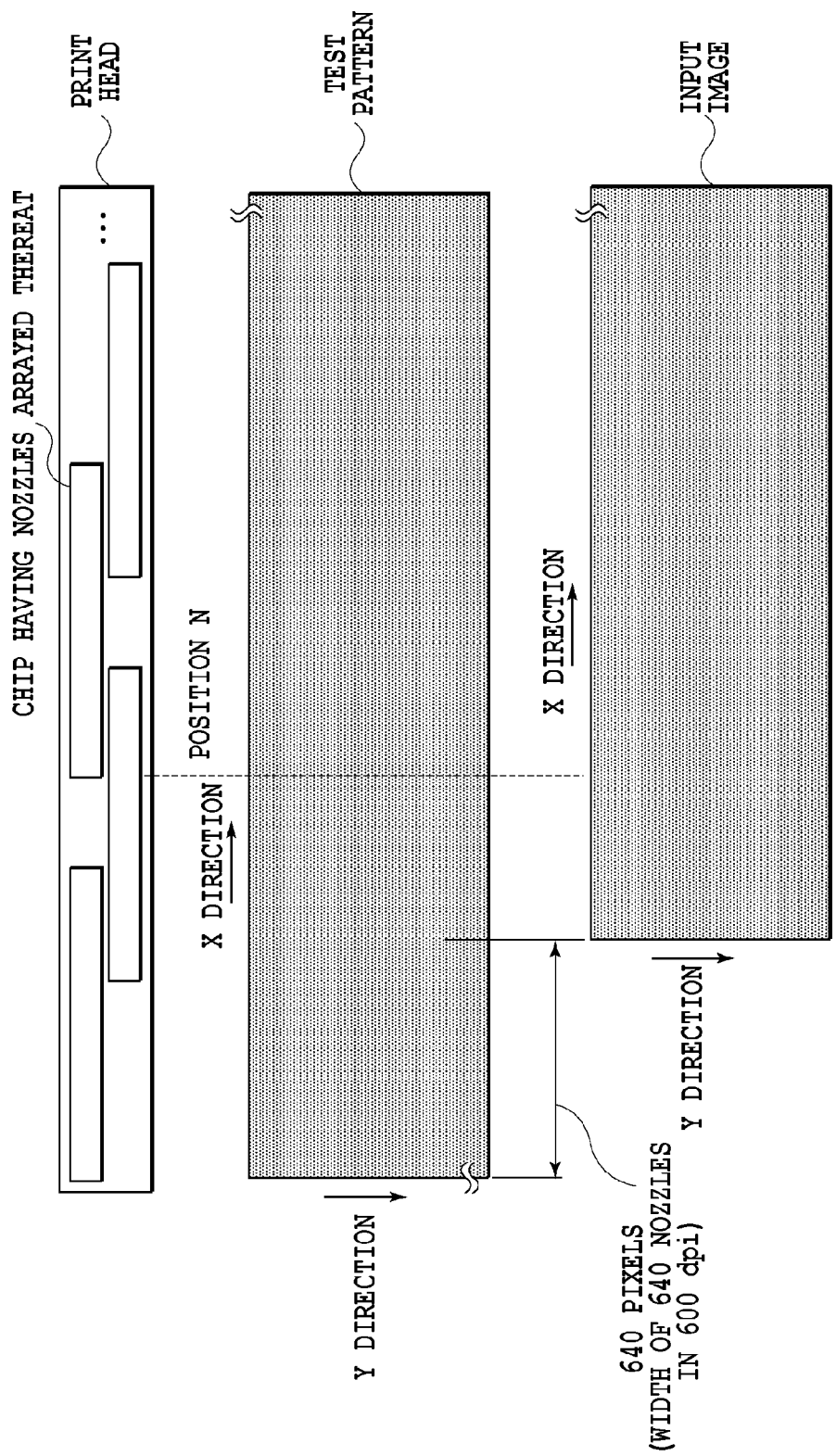
FIG. 11 is a diagram explanatory of input image printing according to the first embodiment.

Next, a description will be given of the processing procedures of the HS correction with reference to FIG. 9B. As illustrated in FIG. 11, when the nozzle position is used as a reference, the position of an input image to be subjected to the HS correction is shifted from the position of the test pattern in the x direction. More specifically, nozzles to be used for printing an input image are shifted by 640 nozzles in the x direction, that is, 640 pixels in the present embodiment, from nozzles to be used for printing a test pattern. As described above, the HS correction adopts the absolute position correspondence. Therefore, the one-dimensional lookup table for the unit area corresponding to a position N on the test pattern is applied to the unit area corresponding to the same position N in the x direction on the input image to be subjected to the HS correction. Here, although the parameters of the one-dimensional lookup table are acquired by the above-described HS analysis, are stored in a predetermined memory, and then, are read, the parameters are not limited to this mode. For example, the parameter may be acquired from an external storage device or a host apparatus such as the host PC 300.

The above-described position N in each unit area on the input image is specified in step S1021. Thereafter, the one-dimensional lookup table corresponding to the position N in each unit area is applied, followed by the HS correction, in step S1022.

The image data after the HS correction illustrated in FIG. 9B is quantized with a dither matrix in the quantizing part 408 through the processing in the TRC processing part 407, as described above with reference to FIG. 7.

Figure 12:
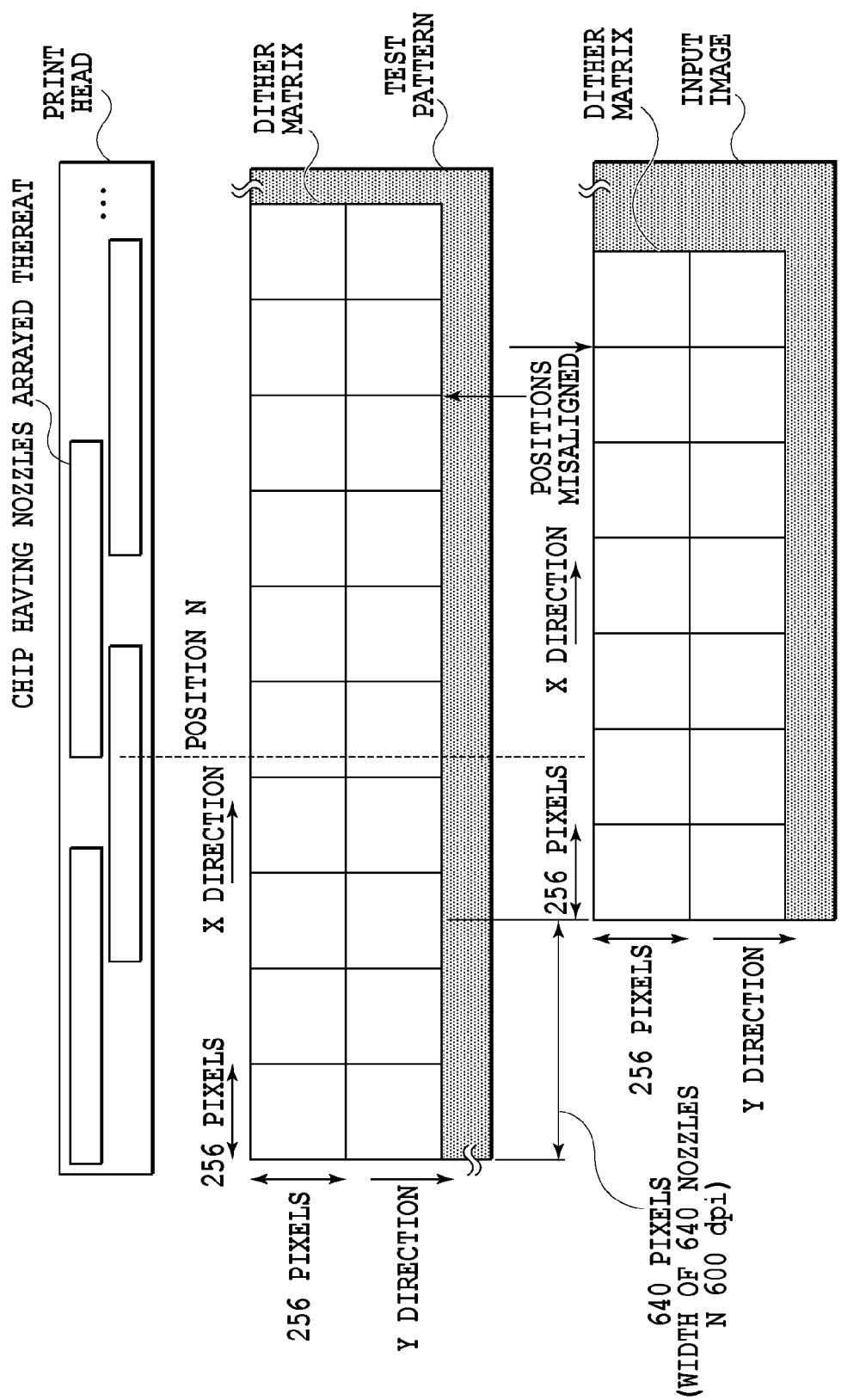
FIG. 12 is a diagram illustrating positions, to which dither matrixes of relative position correspondence according to the first embodiment are applied.

Here, the dither matrix is the same as that used in the HS analysis. FIG. 12 is a diagram illustrating positions, to which dither matrixes of relative position correspondence are applied. In the case where the input image is shifted by 640 nozzles in the x direction from the test pattern, the position of the dither matrix is varied according to the application to the test pattern and the application to the input image in the HS correction. The one-dimensional lookup table applied during the processing in step S1022 described above with reference to FIG. 9B is adapted to correct unevenness of the dither matrix at the position N when the test pattern is quantized. However, as illustrated in FIG. 12, the relative position of a threshold arrangement pattern of the dither matrix with respect to the position N of the input image is different from the relative position of a threshold arrangement pattern of the dither matrix with respect to the position N of the test pattern. As a consequence, the unevenness of the dither matrix corresponding to the position N of the input image comes to be different from that of the dither matrix corresponding to the position N of the test pattern. Thus, the HS correction for the density unevenness caused by the unevenness of the dither matrix becomes unsuitable for the input image, and therefore, the density unevenness due to the quantization occurs on a printout of the input image.

In view of this, the absolute position correspondence is adopted at the time of the quantization with the dither matrix by the quantizing part 408 in one embodiment of the present invention.

Figure 13:
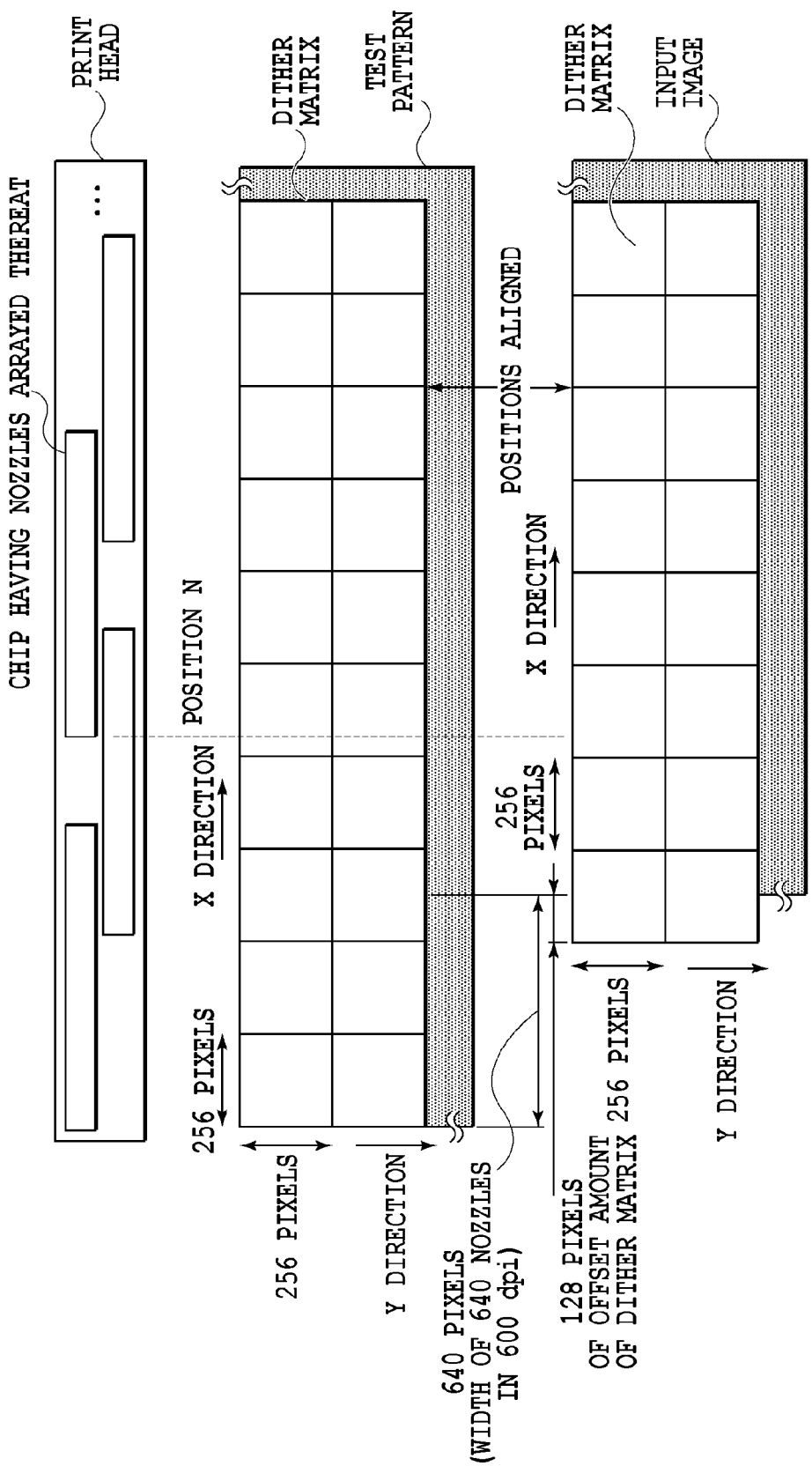
FIG. 13 is a diagram explanatory of one example, in which the absolute position correspondence of the dither matrix is applied according to the first embodiment.

FIG. 13 is a diagram explanatory of the application position of the dither matrix according to the absolute position correspondence. As illustrated in FIG. 13, when the input image is shifted by 640 pixels from the test pattern with reference to the nozzle position, the remainder is obtained by dividing 640 pixels by the size of the dither matrix in the x direction, or 256 pixels. The remainder in this example illustrated in FIG. 13 is 128 pixels. And then, the dither matrix is shifted by 128 pixels in a direction reverse to the x direction. In this manner, the phase of (the threshold arrangement pattern of) the dither matrix in the quantization at the time of printing the test pattern matches the phase of (the threshold arrangement pattern of) the dither matrix in the quantization at the time of printing the input image. Consequently, the unevenness of the dither matrix for the test pattern at the position N becomes the same as that of the dither matrix for the input image. Thus, the HS correction for the density unevenness caused by the unevenness of the dither matrix becomes suitable for the input image. Unlike the relative position correspondence of the dither matrix, the absolute position correspondence can reduce the density unevenness.

Figure 14:
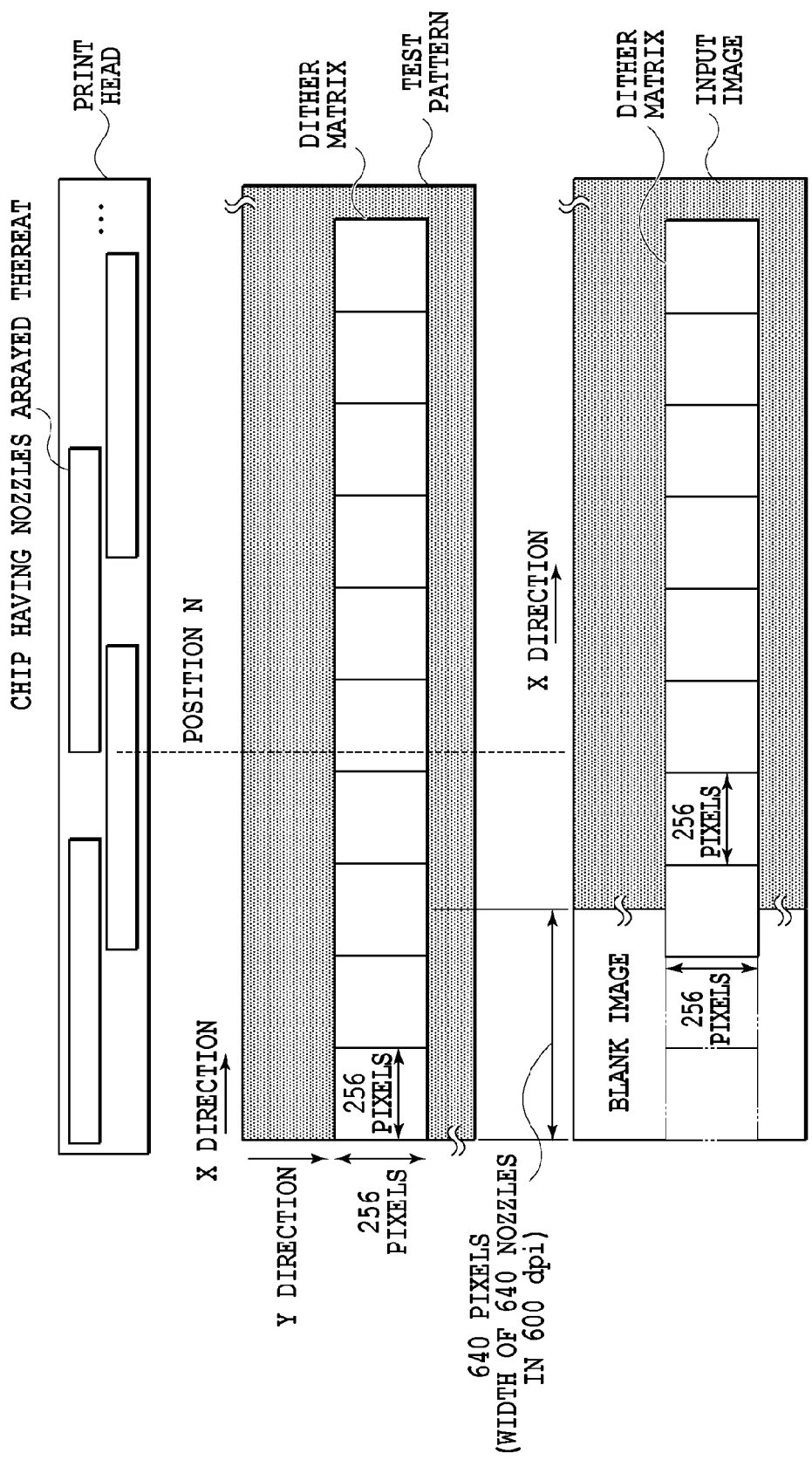
FIG. 14 is a diagram explanatory of another example, in which the absolute position correspondence is applied to quantization during the input image printing according to the first embodiment.

FIG. 14 is a diagram explanatory of another example, to which the absolute position correspondence is applied to quantization during input image printing. FIG. 14 illustrates a case where a test pattern and an input image, both having a resolution of 600 dpi, are shifted by 640 pixels from each other. The size of the dither matrix in an x direction is 256 pixels in a resolution of 600 dpi. In FIG. 14, the left end of the dither matrix is applied to the left end of the test pattern. A blank image of 640 pixels equivalent to shift amount between the test pattern and the input image is added to the left end of the input image in the x direction. And then, the left end of the dither matrix is applied to the left end of the added blank image. The addition of the blank image to the input image also can adopt the absolute position correspondence during the quantization.

Although the image processing illustrated in FIG. 7 is performed at the same time when the test pattern is printed in the above-described embodiment, data already quantized may be previously held, and then, may be printed. For the purpose of this, the phase of a dither matrix used when a test pattern is quantized in advance is just made to match the phase of a dither matrix used when an input image is quantized in HS correction. Moreover, although the dither matrix for the test pattern has been identical to that for the input image in the above-described embodiment, another pattern may be used as long as the difference caused by the number of dots cannot be visually recognized. The visual recognition depends upon the colorant concentration of ink, a difference in ejection amount, and the number of dots, and therefore, another dither matrix may be set based on experimental investigation. Additionally, although the resolution of each of the nozzle, the scanner, and image processing has been set to 600 dpi in the above-described embodiment, the resolution is not limited to this. For example, a resolution may be set according to the resolution of a print element, and further, a resolution that can allow density unevenness may be set. In addition, although the size of the dither matrix has been 256 pixels×256 pixels in the above-described embodiment, the size is not limited to this. For example, the phase of a dither matrix for a test pattern in an HS analysis may match that of a dither matrix for an input image in HS correction. Consequently, it is possible to correct the density unevenness caused by the dither matrix.

Figure 15:
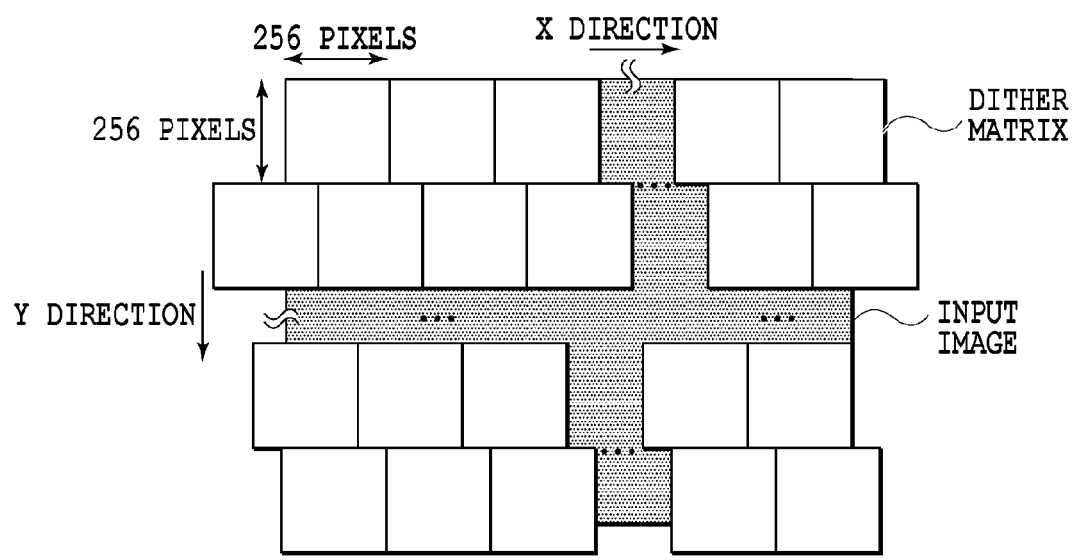
FIG. 15 is a diagram explanatory of tiling a dither matrix in a further example according to the first embodiment.

If dither matrixes are shifted in an x direction when the dither matrixes are arranged in a y direction, as illustrated in FIG. 15, density unevenness cannot be continuous in the y direction, thereby making the density unevenness visually inconspicuous. For example, in the case where dither matrixes are shifted by 64 pixels in the x direction and four dither matrixes are arranged in a y direction, a first dither matrix and a fourth dither matrix in the y direction are not shifted in the x direction. That is to say, when attention is focused on a certain pixel column in the x direction in the case where three dither matrixes are arranged in the y direction, all of the dither matrixes are used. In the case of the 64 shift in the x direction, the size of a test pattern in the y direction is set to 256 pixels equivalent to the width of three dither matrixes, followed by an HS analysis. During input image printing, the dither matrix is used so as to achieve the absolute position correspondence, as described above with reference to FIGS. 13 and 14.

Second Embodiment

A second embodiment of the present invention relates to a mode in which density unevenness of a dither matrix is corrected in a line head having a multiple-array configuration.

FIGS. 16A and 16B are diagrams illustrating the configuration of a line head having four nozzle arrays. In the case of the four-array configuration, four nozzles can be switchably used for a pixel at the same position in an x direction (i.e., a nozzle array direction). For the sake of explanation below, array numbers 1 to 4 are assigned to arrays, as illustrated in FIG. 16A.

Figure 17:
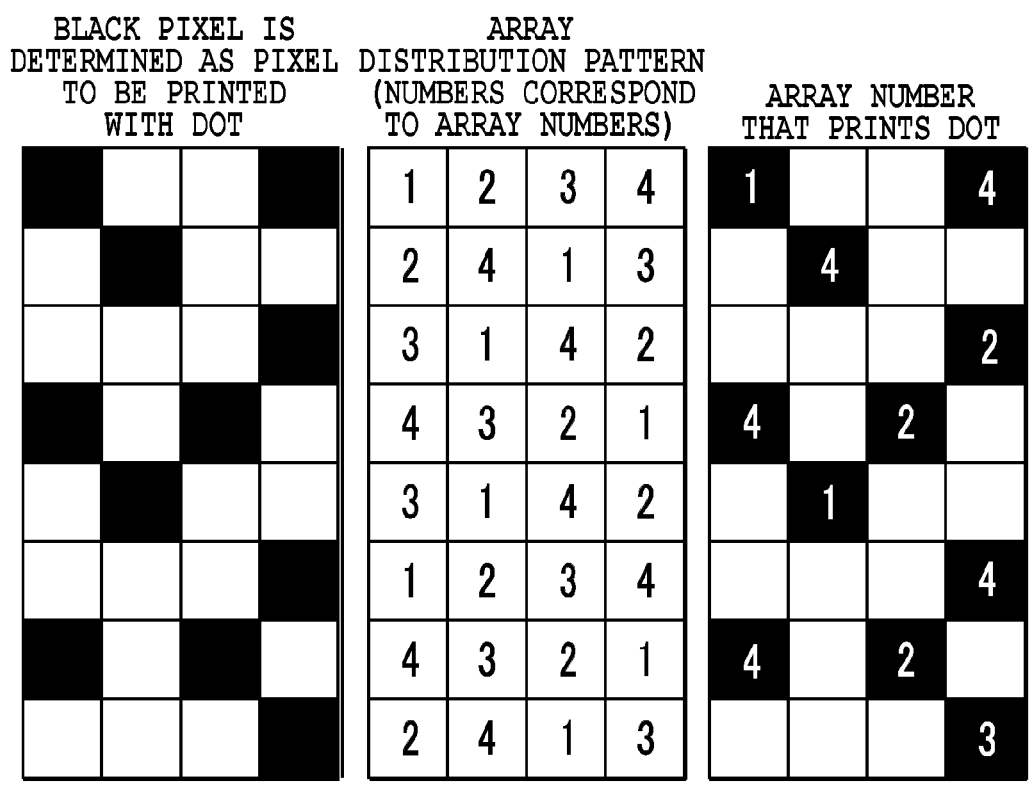
FIG. 17 is a diagram explanatory of a array distribution pattern according to the second embodiment.

FIG. 17 is a diagram illustrating an array distribution pattern for switching four nozzles. The array distributing part 409 (see FIG. 7) determines a nozzle to be used according to the array distribution pattern illustrated in FIG. 17 with respect to print data indicating that dots are printed on pixels with a dither matrix. As illustrated in FIG. 17, a nozzle that is designated for a pixel on the array distribution pattern corresponding to a pixel to be printed with a dot is used. The position of a pixel indicating that a dot is printed by quantization with a dither matrix is not always equally assigned to the first to fourth arrays by an array distribution pattern. As a consequence, an array distribution rate of a nozzle actually used for ejection is varied in an x direction (i.e., a nozzle array direction). Moreover, the unevenness of ejection amount occurs in nozzles in the four arrays assigned at the same position in the x direction. Therefore, in the case of the multiple-array configuration, a one-dimensional lookup table for correcting also density unevenness caused by the unevenness of the array distribution rate may be determined in an HS analysis illustrated in FIG. 9.

Figure 18:
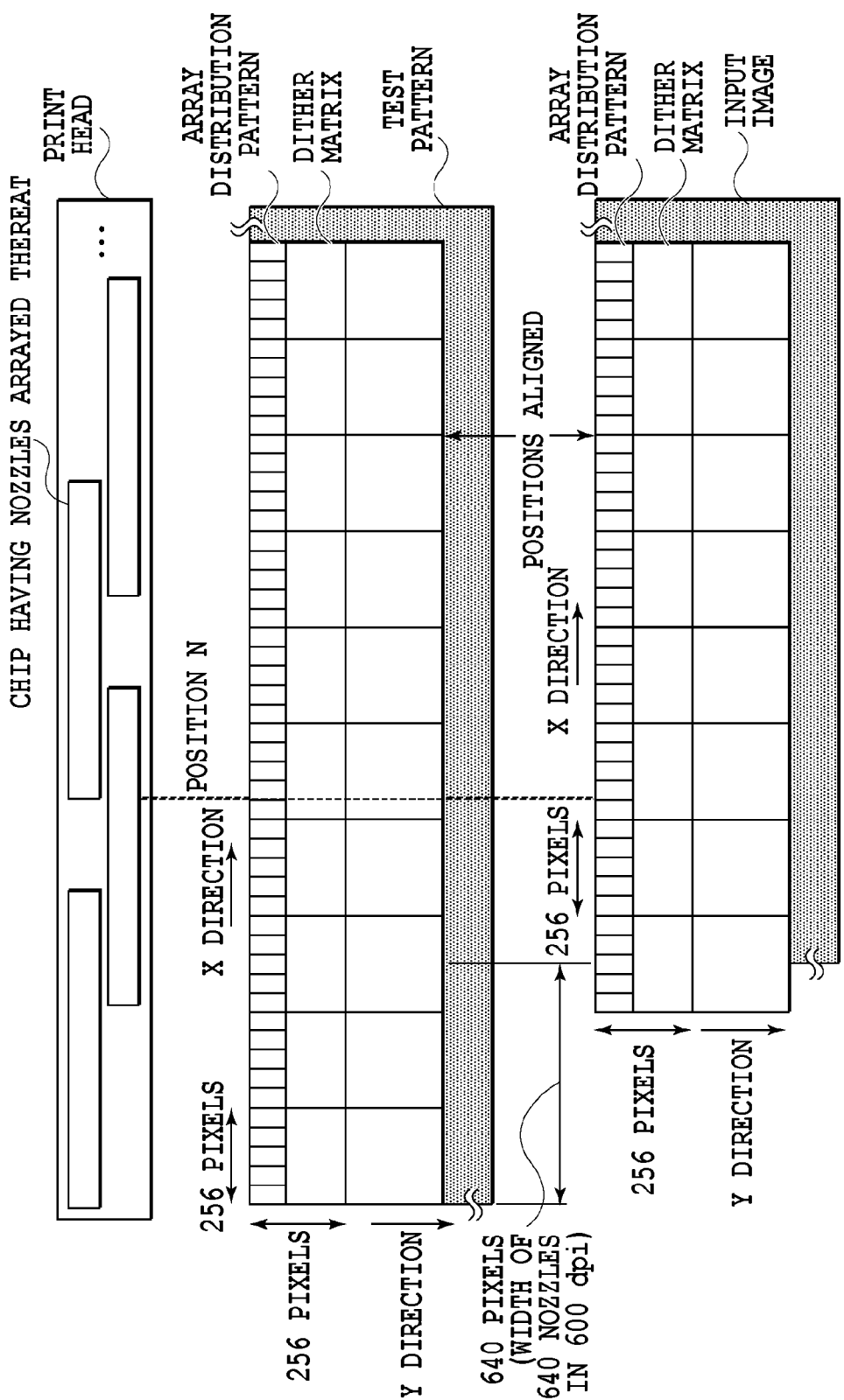
FIG. 18 is a diagram explanatory of the absolute position correspondence between a dither matrix and a distribution pattern according to the second embodiment.

In view of the above, the phase of a dither matrix for a test pattern in an HS analysis is made to match the phase of a dither matrix for an input image in HS correction in the present embodiment. As illustrated in FIG. 18, the phase of an array distribution pattern for a test pattern in an HS analysis process also is made to match the phase of an array distribution pattern for an input image in an HS correction process. Moreover, the phase of the dither matrix is made to match the phase of the array distribution pattern. In this manner, density unevenness caused by the dither matrix and the array distribution pattern can be corrected by the HS correction.

Incidentally, although the multiple-array configuration has been typified by the four-array configuration in the present embodiment, the number of arrays is not limited to four. The other number of arrays can produce the same advantageous effects with the application of the present embodiment.

Third Embodiment

The above-described first and second embodiments relate to the mode of the correction of the density unevenness caused by the dither matrix or the array distribution pattern in the HS processing. A third embodiment of the present invention relates to a mode of correction by the MCS processing part 404 (see FIG. 7), that is, another mode of the correction of the density unevenness caused by the dither matrix or the array distribution pattern.

In the case of the line head having the one-array configuration, the one-dimensional lookup table is determined by the HS analysis described above in the first embodiment. Alternatively, in the case of the line head having the multiple-array configuration, the one-dimensional lookup table is determined by the HS analysis described above in the second embodiment.

Figure 19A:
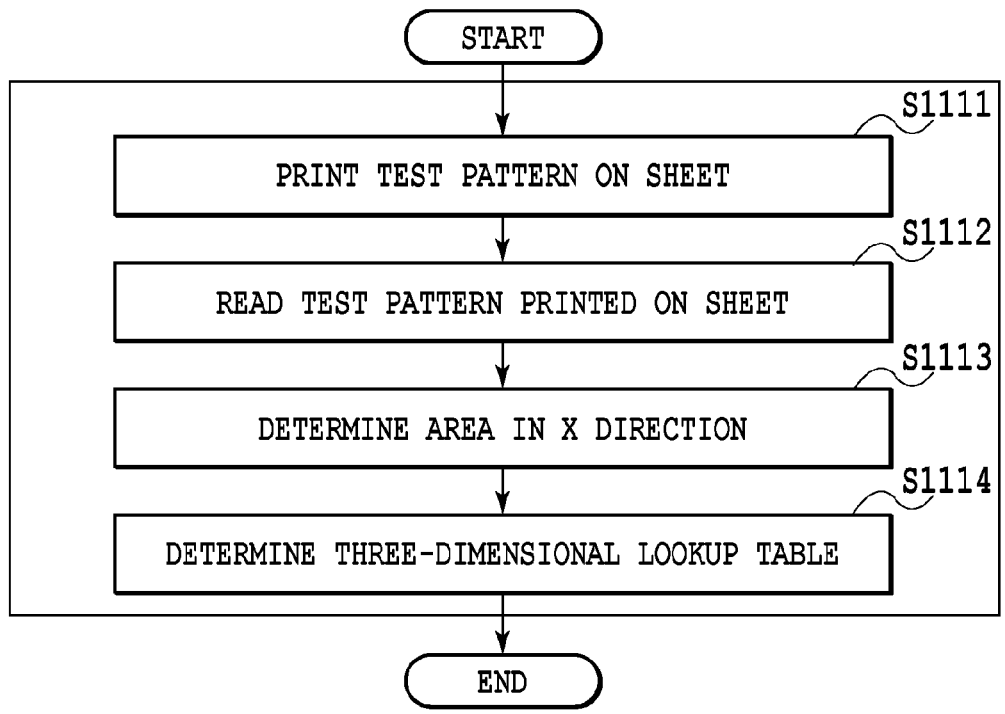
FIGS. 19A and 19B are flowcharts illustrating MCS processing according to a third embodiment of the present invention.
Figure 19B:
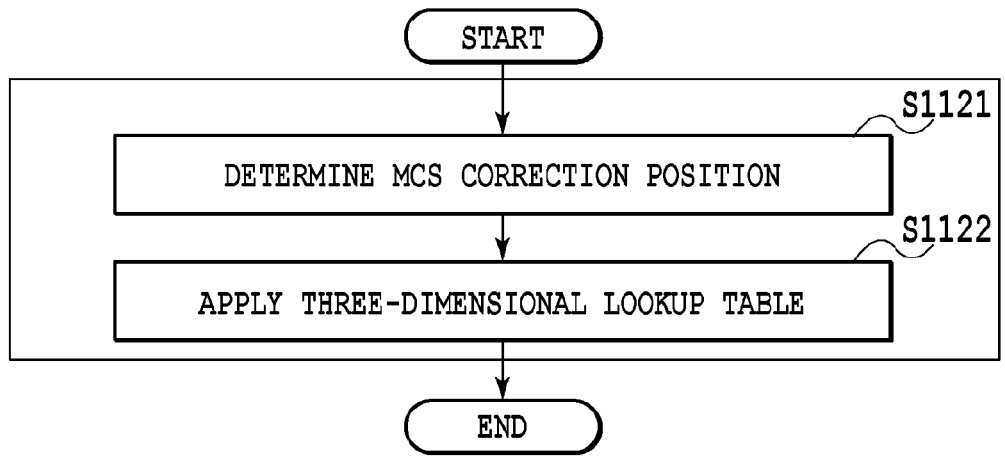

FIGS. 19A and 19B are flowcharts illustrating MCS analysis processing and MCS correction processing, respectively. In FIGS. 19A and 19B, steps S1111 to S1114 are performed during the MCS analysis processing, and further, steps S1121 and S1122 are performed during the MCS correction processing.

Figure 20A:
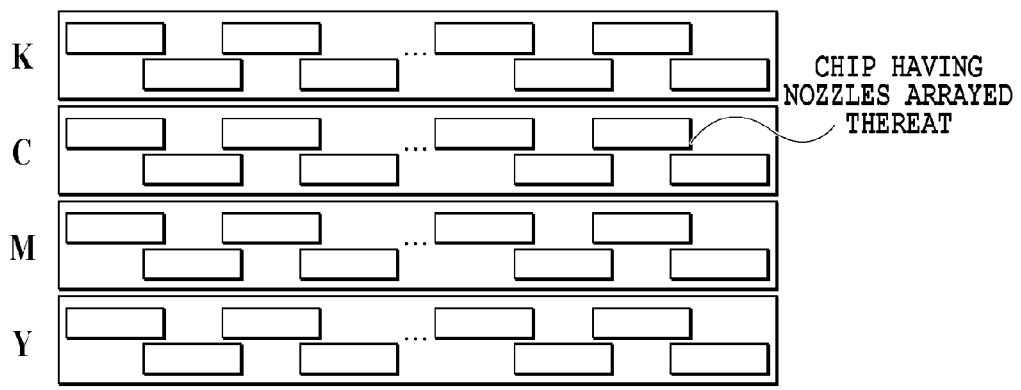
FIGS. 20A and 20B are diagrams explanatory of printing an MCS test pattern according to the third embodiment.
Figure 20B:
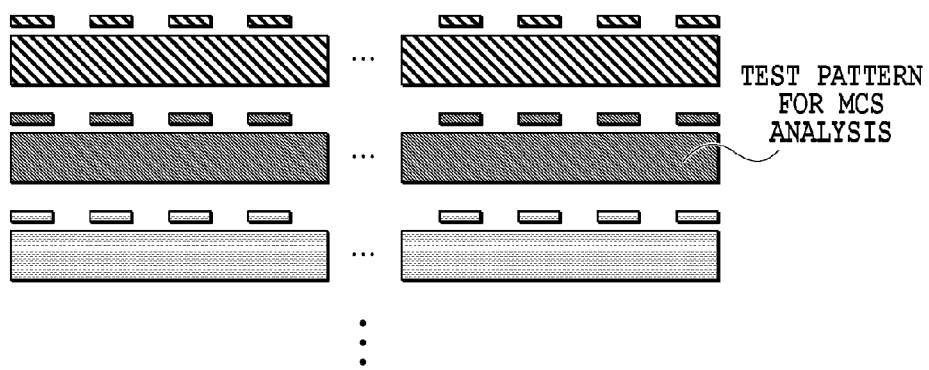

A test pattern is first printed in step S1111 during the MCS analysis processing illustrated in FIG. 19A. A test pattern having a plurality of gradations consisting of one ink color or multiple ink colors, as illustrated in FIG. 20B, is subjected to image processing, followed by printing. The image processing relevant to test pattern printing is performed in the image processing part 402 (see FIG. 7). At this time, the MCS processing is not performed since a bypass processing route indicated by a broken line 411 in FIG. 7 is used. Moreover, the HS processing part (see FIG. 7) uses the one-dimensional lookup table determined by the above-described HS analysis processing. Additionally, since an MCS analysis processing result is reflected on the image processing in the MCS analysis, no previous quantization can be achieved. Therefore, the quantizing part 408 (see FIG. 7) is used when the test pattern is printed.

Next, in step S1112, the test pattern is read in a resolution of 600 dpi by the scanner 107. In step S1113, a unit area in the x direction is determined based on the read result. Here, the unit area in the x direction is assumed as one pixel in a resolution of 600 dpi.

In the end, in step S1114, a three-dimensional lookup table for the MCS processing is created according to the read RGB value of the determined unit area in the following manner. Specifically, a value obtained by averaging 256 pixels as the size of the dither matrix in the y direction with respect to one pixel in the x direction, for example, is used as the read RGB value. Test pattern colors Rp, Gp, and Bp close to target colors Rt, Gt, and Bt with respect to input device colors Ri, Gi, and Bi in the three-dimensional lookup table used for the MCS processing are estimated from the read RGB value. An estimating method will be described below. The target colors Rt, Gt, and Bt are expressed by the RGB values of test pattern colors corresponding to the device colors Ri, Gi, and Bi in the case where, for example, a print head having a normal ejection amount performs a printing operation. The read RGB values in the case where the target colors Rt, Gt, and Bt of the test pattern colors are printed by a print head whose ejection amount is a normal value have been previously set as target values. And then, the test pattern colors Rp, Gp, and Bp close to the target read RGB values are estimated with the read RGB values having the plurality of gradations of the test patterns printed in step S1111. Subsequently, device colors Rn, Gn, and Bn corresponding to the test pattern colors Rp, Gp, and Bp, respectively, are estimated. For example, the correspondence relationship between the device colors and the pattern colors in the case where a print head having a normal ejection amount performs a printing operation has been previously determined, thereby estimating the device colors Rn, Gn, and Bn. And then, a correction table to be used for converting the input device colors Ri, Gi, and Bi into the device colors Rn, Gn, and Bn, respectively, is created. This conversion table is used with respect to patterns having a plurality of gradations, thus creating the three-dimensional lookup table for the MCS processing.

Next, the MCS correction will be described with reference to FIG. 19B. In this case, an input image is shifted from the test pattern in the x direction, as illustrated in FIG. 11. Specifically, nozzles to be used are located at positions shifted by 640 nozzles from the test pattern in the x direction. The absolute position correspondence is used during the MCS correction in the same manner as the HS correction. Therefore, the three-dimensional lookup table corresponding to the same position N on the test pattern is applied to a unit area corresponding to the position N in the x direction on the input image to be subjected to the MCS correction. In this manner, the position is specified in step S1121. And then, the three-dimensional lookup table is applied in step S1122.

After the above-described MCS processing, quantization is performed with a dither matrix in the quantizing part 408 (see FIG. 7). The dither matrix is identical to that used for the MCS analysis. As a consequence, in the case where the dither matrix is used for the relative position correspondence, as illustrated in FIG. 12, the unevenness of the dither matrix at the position N of the input image is different from that of the dither matrix at the position N of the test pattern. Thus, the MCS correction for the density unevenness caused by the unevenness of the dither matrix is unsuitable for the input image. In the meantime, in the case of the multiple-array configuration, the three-dimensional lookup table for correcting also the density unevenness caused by the unevenness of the array distribution rate is created by the MCS analysis illustrated in FIG. 19A. Therefore, in the case of the array distribution pattern of the relative position correspondence, the MCS correction for the density unevenness caused by the array distribution pattern becomes unsuitable for the input image.

In view of the above, the phase of the dither matrix for the test pattern for the MCS analysis is made to match the phase of the dither matrix for the input image in the MCS correction in the present embodiment. Furthermore, the phase of the array distribution pattern also is made to match, as illustrated in FIG. 18. FIG. 18 illustrates the array distribution pattern arranged on the dither matrix. In this manner, the MCS correction to the density unevenness caused by the dither matrix and the array distribution pattern can be achieved.

Incidentally, although the MCS processing has been described by way of the example in which the RGB value of the image data is corrected to another RGB value in the present embodiment, it is not limited to the RGB value. For example, the RGB value may be converted into a CMYK value, or a CMYK value may be converted into another CMYK value.

Other Embodiments

Although the dither matrix is used for binarization in the above-described embodiments, the application of the present invention is not limited to these embodiments. For example, 256-value image data is quantized into four-value data, and then, the data may be binarized with a dot arrangement pattern corresponding to each of levels indicated by the four-value data. In addition, although the ink jet printing apparatus has been described in the above-described embodiments, the application of the present invention is not limited to these embodiments. For example, a printing apparatus for forming dots by thermal transfer or the like may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252266 filed on Nov. 16, 2012, which is hereby incorporated by reference herein in its entirety.

What is claimed is:

1. An image processing apparatus that generates print data used for performing printing using one or more printing element arrays in each of which printing elements are arrayed, said apparatus comprising:
   a determining unit configured to determine a correction parameter for each of unit areas in an array direction of the printing elements, based on a measurement result of a test pattern printed based on data that has been subjected to quantization using a dither matrix;
   a correction unit configured to apply the correction parameter to image data by switching the application of the correction parameter per unit area so as to correct the image data; and
   a quantization unit configured to quantize the image data corrected by said correction unit by using the dither matrix, for generating print data,
   wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

2. The image processing apparatus as claimed in claim 1, further comprising a printing element array distribution unit configured to determine to which one of printing element arrays the print data generated in the quantization by said quantization unit is distributed, with the use of a distribution pattern, at the time of performing printing using the plurality of printing element arrays,
   wherein the phase of the dither matrix with respect to the printing element array in the quantization of the test pattern, to which the dither matrix is applied, the phase of the dither matrix with respect to the printing element array in the quantization of the image data, in which the dither matrix is applied, a phase of the distribution pattern with respect to the printing element array which is applied to data of the test pattern that has been subjected to the quantization in which the dither matrix is applied, and a phase of the distribution pattern with respect to the printing element array which is applied to the image data that has been subjected to the quantization, in which the dither matrix is applied, match one another.

3. The image processing apparatus as claimed in claim 1, wherein the correction parameter is a parameter of a one-dimensional lookup table for correcting data of primary color.

4. The image processing apparatus as claimed in claim 1, wherein the correction parameter is a parameter of a three-dimensional lookup table for correcting data of primary color or multiple colors.

5. A printing apparatus that performs printing based on print data by using one or more printing element arrays in each of which printing elements are arrayed, said apparatus comprising:
   a determining unit configured to determine a correction parameter for each of unit areas in an array direction of the printing elements, based on a measurement result of a test pattern printed based on data that has been subjected to quantization using a dither matrix;
   a correction unit configured to apply the correction parameter to image data by switching the application of the correction parameter per unit area so as to correct the image data; and
   a quantization unit configured to quantize the image data corrected by said correction unit by using the dither matrix, for generating print data,
   wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

6. The printing apparatus as claimed in claim 5, further comprising a printing element array distribution unit configured to determine to which one of the plurality of printing element arrays the print data generated in the quantization by said quantization unit is distributed, with the use of a distribution pattern, at the time of performing printing using the plurality of printing element arrays,
   wherein the phase of the dither matrix with respect to the printing element array in the quantization of the test pattern, to which the dither matrix is applied, the phase of the dither matrix with respect to the printing element array in the quantization of the image data, in which the dither matrix is applied, a phase of the distribution pattern with respect to the printing element array which is applied to data of the test pattern that has been subjected to the quantization, in which the dither matrix is applied, and a phase of the distribution pattern with respect to the printing element array which is applied to the image data that has been subjected to the quantization, in which the dither matrix is applied, match one another.

7. An image processing method for generating print data used for performing printing using one or more printing element arrays in each of which printing elements are arrayed, said method comprising:
   a determining step of determining a correction parameter for each of unit areas in an array direction of the printing elements, based on a measurement result of a test pattern printed based on data that has been subjected to quantization using a dither matrix;
   a correction step of applying the correction parameter to image data by switching the application of the correction parameter per unit area so as to correct the image data; and
   a quantization step of quantizing the image data corrected in said correction step by using the dither matrix, for generating print data,
   wherein a phase of the dither matrix with respect to the printing element array in the quantization of the test pattern, to which the dither matrix is applied, matches a phase of the dither matrix with respect to the printing element array in the quantization of the image data, to which the dither matrix is applied.

8. The image processing method as claimed in claim 7, further comprising a printing element array distribution step of determining to which one of the plurality of printing element arrays, the print data generated in the quantization in said quantization step is distributed, with the use of a distribution pattern, at the time of performing printing using the plurality of printing element arrays, wherein the phase of the dither matrix with respect to the printing element array in the quantization of the test pattern, to which the dither matrix is applied, the phase of the dither matrix with respect to the printing element array in the quantization of the image data, in which the dither matrix is applied, a phase of the distribution pattern with respect to the printing element array which is applied to data of the test pattern that has been subjected to the quantization, in which the dither matrix is applied, and a phase of the distribution pattern with respect to the printing element array which is applied to the image data that has been subjected to the quantization, in which the dither matrix is applied, match one another.

\* \* \* \* \*